(12) United States Patent
Barbalinardo et al.

(10) Patent No.: US 12,318,661 B2
(45) Date of Patent: Jun. 3, 2025

(54) EXERCISE GUIDANCE USING MULTI-MODAL DATA

(71) Applicant: Tonal Systems, Inc., San Francisco, CA (US)

(72) Inventors: Giuseppe Barbalinardo, Berkeley, CA (US); Joshua Ben Shapiro, Toronto (CA); Asim Kadav, Mountain View, CA (US); Ivan Savytskyi, Mississauga (CA); Rajiv Bhan, Mountain View, CA (US); Rustam Paringer, Samara (RU); Aly E. Orady, Austin, TX (US)

(73) Assignee: Tonal Systems, Inc., San Francisco, CA (US)

( * ) Notice: Subject to any disclaimer, the term of this patent is extended or adjusted under 35 U.S.C. 154(b) by 0 days.

(21) Appl. No.: 18/380,575

(22) Filed: Oct. 16, 2023

(65) Prior Publication Data
US 2024/0123288 A1    Apr. 18, 2024

Related U.S. Application Data

(60) Provisional application No. 63/417,052, filed on Oct. 18, 2022.

(51) Int. Cl.
*A63B 24/00* (2006.01)
*G06T 7/73* (2017.01)
(Continued)

(52) U.S. Cl.
CPC ...... *A63B 24/0062* (2013.01); *A63B 24/0075* (2013.01); *G06T 7/73* (2017.01);
(Continued)

(58) Field of Classification Search
CPC ... A63B 24/0075; A63B 24/0062; G06T 7/73; G06T 2200/24; G06T 2207/10016;
(Continued)

(56) References Cited

U.S. PATENT DOCUMENTS

| 8,213,680 B2 | 7/2012 | Fitzgibbon |
| 9,251,437 B2 | 2/2016 | Krizhevsky |

(Continued)

FOREIGN PATENT DOCUMENTS

| WO | 2022221685 | 10/2022 |

OTHER PUBLICATIONS

Brownlee "How to Configure Image Data Augmentation in Keras", Machine Leaning Master, www.machinelearningmastery.com, Jul. 5, 2019 (Year: 2019).

(Continued)

*Primary Examiner* — Malina D. Blaise
(74) *Attorney, Agent, or Firm* — Van Pelt, Yi & James LLP

(57) ABSTRACT

A first output is received from a first hardware optical sensor. A second output is received from a second hardware sensor. Guidance is provided for a movement via a user interface, wherein the guidance is based at least in part on: the first output from the first hardware optical sensor; the second output from the second hardware sensor; and a model based at least in part on historical performance of the movement; and wherein at least one of the first output and the second output triggers a condition.

20 Claims, 16 Drawing Sheets

(51) Int. Cl.
*G06V 20/40* (2022.01)
*G06V 40/20* (2022.01)

(52) U.S. Cl.
CPC .............. *G06V 20/41* (2022.01); *G06V 40/23* (2022.01); *A63B 2024/0065* (2013.01); *G06T 2200/24* (2013.01); *G06T 2207/10016* (2013.01); *G06T 2207/20081* (2013.01); *G06T 2207/30196* (2013.01)

(58) Field of Classification Search
CPC ........... G06T 2207/20081; G06T 2207/30196; G06V 20/41; G06V 40/23
See application file for complete search history.

(56) References Cited

U.S. PATENT DOCUMENTS

| | | | |
|---|---|---|---|
| 9,626,788 B2 | 4/2017 | Corazza | |
| 10,489,683 B1 | 11/2019 | Koh | |
| 10,568,570 B1* | 2/2020 | Sherpa | A61B 5/486 |
| 10,930,032 B1 | 2/2021 | Bharadwaj | |
| 11,509,819 B2 | 11/2022 | Gupta | |
| 11,521,348 B2 | 12/2022 | Bond | |
| 11,645,798 B1 | 5/2023 | Demyanov | |
| 11,660,022 B2 | 5/2023 | Assouline | |
| 11,769,110 B1 | 9/2023 | Bourke | |
| 11,836,835 B2 | 12/2023 | Chai | |
| 11,915,365 B2 | 2/2024 | Guler | |
| 11,978,142 B2 | 5/2024 | Kang | |
| 12,073,643 B2 | 8/2024 | Hosoi | |
| 2003/0164829 A1 | 9/2003 | Bregler | |
| 2011/0228976 A1 | 9/2011 | Fitzgibbon | |
| 2012/0183939 A1* | 7/2012 | Aragones | A63B 24/0062 434/247 |
| 2017/0364826 A1 | 12/2017 | Mitarai | |
| 2018/0226146 A1* | 8/2018 | Aragones | G16H 20/60 |
| 2019/0295305 A1 | 9/2019 | Yang | |
| 2020/0090408 A1 | 3/2020 | Virkar | |
| 2020/0321120 A1* | 10/2020 | Neumann | G16H 50/20 |
| 2020/0338394 A1* | 10/2020 | Neumann | A63B 24/0062 |
| 2021/0064925 A1 | 3/2021 | Shih | |
| 2021/0134426 A1* | 5/2021 | Mason | G16H 50/70 |
| 2021/0209349 A1 | 7/2021 | Mehl | |
| 2021/0232924 A1 | 7/2021 | Sun | |
| 2021/0343059 A1 | 11/2021 | Villegas | |
| 2022/0012551 A1 | 1/2022 | Hosoi | |
| 2022/0035443 A1* | 2/2022 | Winold | G06V 20/20 |
| 2022/0066544 A1 | 3/2022 | Kwon | |
| 2022/0108468 A1 | 4/2022 | Nakamura | |
| 2022/0232162 A1 | 7/2022 | Gupta | |
| 2022/0262010 A1 | 8/2022 | Shpuza | |
| 2022/0292752 A1 | 9/2022 | Kang | |
| 2022/0296963 A1* | 9/2022 | Belson | A63B 71/0622 |
| 2022/0310226 A1 | 9/2022 | Niri | |
| 2022/0327714 A1 | 10/2022 | Cook | |
| 2022/0358310 A1 | 11/2022 | Lin | |
| 2023/0015037 A1 | 1/2023 | Kojima | |
| 2023/0031291 A1 | 2/2023 | Nakamura | |
| 2023/0037339 A1 | 2/2023 | Villegas | |
| 2023/0096013 A1 | 3/2023 | Agrawal | |
| 2023/0103112 A1 | 3/2023 | Ingo | |
| 2023/0123820 A1 | 4/2023 | Wang | |
| 2023/0196602 A1 | 6/2023 | Assouline | |
| 2023/0316811 A1* | 10/2023 | Tavor | G06T 17/00 |
| 2023/0364467 A1 | 11/2023 | Areum | |
| 2024/0042281 A1 | 2/2024 | Kashyap | |
| 2024/0193809 A1 | 6/2024 | Ostadabbas | |

OTHER PUBLICATIONS

De Souza et al., "Procedural Generation of Videos to Train Deep Action Recognition Networks", 2017 IEEE Conference on Computer Vision and Pattern Recognition (Year: 2017).

Deneke et al., "Designing a Simulation Platform for Generation of Synthetic Videos for Human Activity Recognition", International Conference on Computational Science and Computational Intelligence (CSCI) (Year: 2019).

Yang, et al., "TransMoMo: Invariance-Driven Unsupervised Video Motion Retargeting", CVPR 2020 Computer Vision Foundation (Year: 2020).

Villegas et al., Neural Kinematic Networks for Unsupervised Motion Retargetting, arXiv: 1804.05653v1, Apr. 16, 2018, 15 pages.

* cited by examiner

VIDEO / IMAGE DOMAIN          KEY POINT / POSE DOMAIN
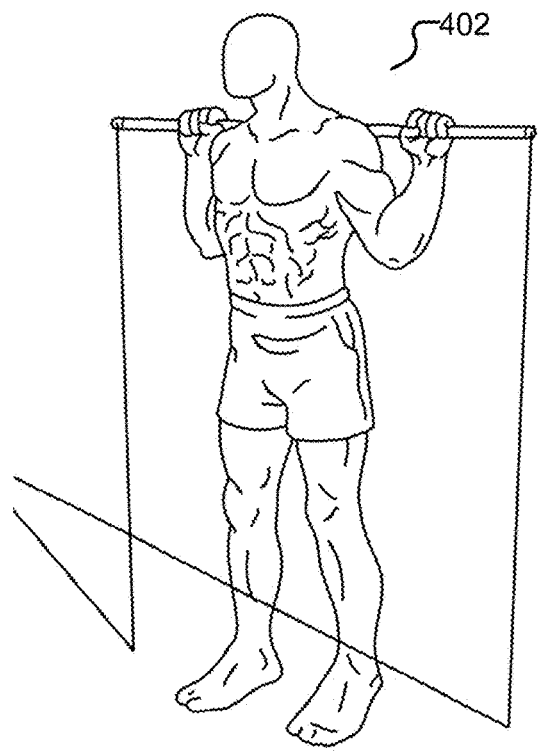
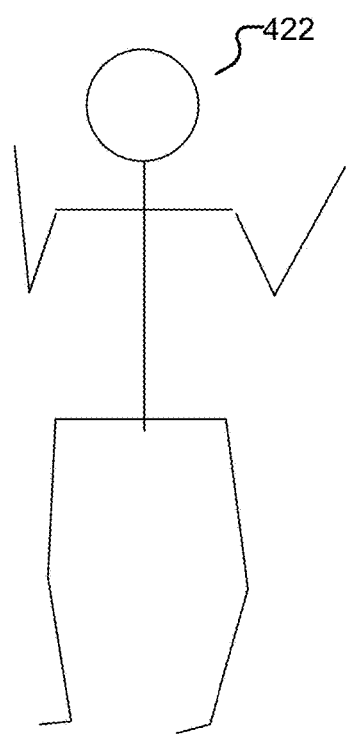
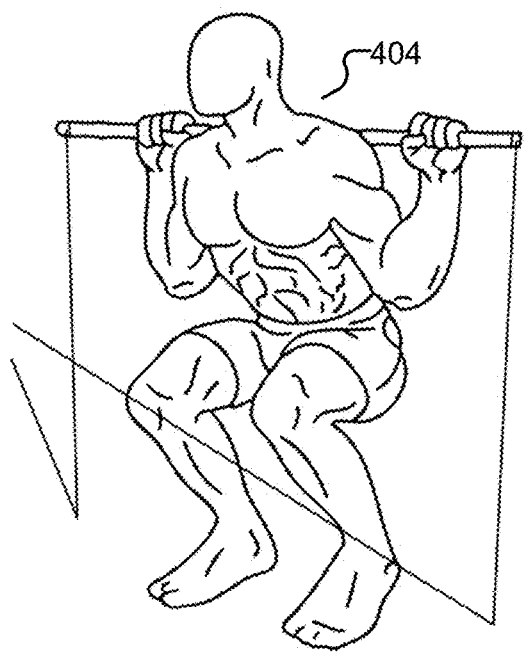
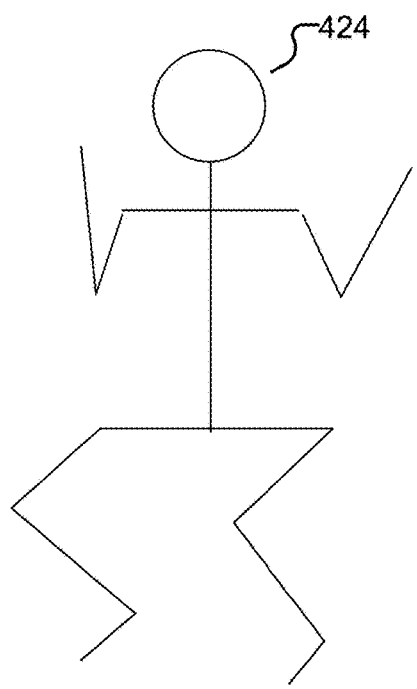
FIG. 4

| Find database objects | | | | | | |
|---|---|---|---|---|---|---|
| Starting with... | | | | | | |

⊞ CHALLENGES
⊞ CHALLENGE_ENROLLMENTS
⊞ CLIENT_TRIGGERS
⊞ COACHES
⊞ CONTENT_CARDS
⊞ CV_EVENT_BENCH_PRESS_ARMS_WRI...
⊞ CV_EVENT_BIRD_DOG_WITH_ROW_LE...
⊞ CV_EVENT_BULGARIAN_SPLIT_SQUAT...
⊞ CV_EVENT_FACE_PULL_ARMS_POSITI...
⊞ CV_EVENT_HIP_KNEE_ANGLE_DIFFERE...
⊞ CV_EVENT_INCLINE_CHEST_PRESS_EL...
⊞ CV_EVENT_INLINE_CHEST_PRESS_HIP...
⊞ CV_EVENT_INSUFFICIENT_ROTATION_...
⊞ CV_EVENT_KNEE_ANKLE_DIST
⊞ CV_EVENT_LIFT_CHOP_TORSO_TWIST
⊞ CV_EVENT_PLANKS_HIPS
⊞ CV_EVENT_POSE_ANGLE_EVENT
⊞ CV_EVENT_RDL_BENDING_VS_HINGING
⊞ CV_EVENT_SHOULDER_SLUMP_PROB...
⊞ CV_EVENT_SINGLE_LEG_RDL_BAD_FO...

⊞ CLIENT_TRIGGERS  [Preview Data] ×

| Columns | Data Type |
|---|---|
| ID | VARCHAR(256) |
| CREATED_AT | TIMESTAMP_TZ(9) |
| UPDATED_AT | TIMESTAMP_TZ(9) |
| DELETED_AT | TIMESTAMP_TZ(9) |
| NAME | VARCHAR(256) |
| EXPRESSION | VARCHAR(256) |
| PRIORITY | NUMBER(38,0) |
| TYPE | VARCHAR(256) |
| PUBLISHED | BOOLEAN |
| MOVEMENT_ID | VARCHAR(256) |

☐ All Queries | Saved 17 seconds ago

[Run]

1 'DBT_DATABASE_PRODUCTION'."BRONZE_PRODUCT"."CLIENT_TRIGGERS" use database dbt_database_production;
2 select * from bronze_product.workout_activities wa where wa.device_id = '08000050000186' order by wa.created_at desc;

Results  Data Preview
View: DBT_DATABASE_PRODUCTION.BRONZE_PRODUCT.CLIENT_TRIGGERS  (Data)  (SQL)  ⟵ 602

[Filter re⊡lt...]

| Row | ID | CREATED_AT | UPDATED_AT | DELETED_AT | NAME |
|---|---|---|---|---|---|
| 9 | c8429aaa-c... | 2019-06-12 | 2019-06-12 | | Not RepStar... |
| 10 | 6845444c-5... | 0001-01-01 | 2019-02-20 | 2019-10-09 | 1 Rep Left |
| 11 | 943ca2f6-d... | 0001-01-01 | 2019-02-20 | 2019-10-09 | Finished Sid... |
| 12 | 99aa8bf5-2... | 0001-01-01 | 2019-02-20 | 2019-10-09 | 1 Sided Rep... |
| 13 | 4b46791f-6... | 2019-06-13 | 2019-06-13 | | RepStartsOn... |
| 14 | 03da08e1-a... | 2020-05-08 | | | Try not to re... |
| 15 | 70f51ab2-8a... | 2020-03-05 | 2020-03-05 | | Reach your ... |
| 16 | 5bc2929e-0... | 2020-05-08 | | | Move forwar... |
| 17 | 253104e1-5... | 2020-03-05 | 2020-03-05 | | Pull away fro... |
| 18 | c53eaaac9-3... | 2020-05-08 | | | Move furthe... |
| 19 | 260fc6d9-7... | 2020-05-08 | | | Move furthe... |
| 20 | 9467813e-4... | 2020-05-08 | | | Move furthe... |
| 21 | 11b49d7e-a... | 2020-05-08 | | | Try not to re... |
| 22 | 2778d31b-9... | 2020-03-05 | 2020-03-05 | | Bring your h... |
| 23 | 33bbat57-8... | 2020-05-08 | | | Stay level an... |
| 24 | 21eae0d9-5... | 2020-05-27 | | | Get lower, if ... |
| 25 | 0c269167-4... | 2020-05-08 | | | Try not to re... |
| 26 | ea0247b0-f... | 2020-05-08 | | | Move furthe... |

| Expression | PRIORITY | TYPE | PUBLISHED |
|---|---|---|---|
| !RepStartsOnMin && MinROM > 0.15 && MinROM < 0.5 | | Audio | FALSE |
| PrescribedReps > 4 && (PrescribedReps - 1) == RepCount | | Audio | FALSE |
| !IsTwoSided && IsTwoSided && (PrescribedReps == RepCount) | | Audio | FALSE |
| IsTwoSided && (PrescribedReps - 1) == RepCount) | 1 | Audio | FALSE |
| RepStartsOnMin && MaxROM < -0.15 && MaxROM > -0.5 | | | |
| Movementid == '65ebd242-b9d3-405d-9922-0c6e3df0ce22' && MinPosition < 2.0 && M... | | Text | TRUE |
| Movementid == 'f8bad1ec-c502-4379-b2f4-e9198245e534' && !RepStartsOnMin && Ma... | 10 | Text | FALSE |
| Movementid == '8e82d264-dc5b-4ff1-8548-5a75142cb442' && MinPosition < 4.0 && Mi... | | Text | TRUE |
| Movementid == '56b1c9b5-8240-4f2d-aa92-badc0dd62176' && RepStartsOnMin && Ma... | 10 | Text | TRUE |
| Movementid == '3671753e-8f7a-43b9-b20c-fce4a0991a0a' && MinPosition < 2.0 && Min... | | Text | FALSE |
| Movementid == 'ea30d4b4-4b45-4dc6-a4ee-1b8a85eb88f9' && MinPosition < 2.0 && Mi... | | Text | TRUE |
| Movementid == 'f227965f-12fc-4d6a-8e80-5cf624e69e86' && MinPosition < 4.0 && Min... | | Text | TRUE |
| Movementid == 'c6f063ad-ffdc-4606-8352-c4bbf97c50ff' && MinPosition < 2.0 && MinP... | | Text | FALSE |
| Movementid == 'c3387b0d-c4e4-470f-aa7a-1fe20a3ce071' && RepStartsOnMin && MinR... | 10 | Text | FALSE |
| Movementid == '2f5a1f17-32cd-4fb6-9213-46a19a889837' && RepCount >= 2 && LeftRi... | | Text | TRUE |
| Movementid == 'ef5f1802-a99e-4e56-b473-32bbf353fb73' && MinPosition > 6.0 && Rep... | | Text | TRUE |
| Movementid == '406f12cb-3aaa-43e8-af19-23c6f28c31d3' && MinPosition < 2.0 && Min... | | Text | TRUE |
| Movementid == 'af1785f9-cd7b-4725-ba56-3ea4eae038c2' && MinPosition < 4.0 && Min... | | Text | TRUE |

FIG. 6A (Cont. 1)

| NAME | EXPRESSION |
|---|---|
| Push the floor away and stand completely straight at the top! (Barbell Deadlift) | MovementId == 'c4 |
| Make sure your hands come back right outside your shoulders. (Standing Incline Press) | MovementId == '5c |
| Try not to rest the weight down between reps. (Seated Row) | MovementId == '51 |
| Don't cheat your Range of Motion, extend the arms all the way (Bent Over Row) | MovementId == 'b4 |
| Extend your arms all the way out! (Seated Row) | MovementId == '51 |
| Move forward away from your Tonal, at least 2 inches away. (Tall Kneeling Single Arm Chest Press) | MovementId == '40 |
| Move further away from the Tonal arms, at least 2 inches away. (Incline Lift) | MovementId == 'b6 |
| Get a full range of motion and bring the hands down under your chin. (Seated Overhead Press) | MovementId == 'c3 |
| Don't rest the handle at the bottom, keep it close to your inside hip. (1/2 Kneeling Lift) | MovementId == '56 |
| Bring both arms fully back parallel with your chest. (Reverse Fly) | MovementId == 'b5 |
| Move further away from the Tonal arms, at least 6 inches away. (Resisted Dead Bug) | MovementId == '92 |
| Pull both arms fully down. Pinch a pencil between your shoulder blades. (Seated l at Pulldown) | MovementId == '5a |

| | C | D |
|---|---|---|
| 8 | Barbell Front Squat | Keep your elbows up and shoulders pulled back |
| 9 | Standing Incline Press | Keep your elbows lower |
| 10 | Standing Incline Press | Keep your elbows away from the body |
| 11 | Single Leg RDL | At the bottom of the rep, keep your leg and torso parallel to the floor |
| 12 | Single Arm Single Leg RDL | At the bottom of the rep, keep your leg and torso parallel to the floor |
| 13 | Single Arm Single Leg RDL | Keep knee slightly bent and do not squat |
| 14 | Bodyweight Single Leg RDL | Keep knee slightly bent and do not squat |
| 15 | Single Leg RDL | Keep knee slightly bent and do not squat |
| 16 | Goblet Squat | Keep your chest up as you sit back and down |
| 17 | Barbell Front Squat | Keep your chest up as you sit back and down |
| 18 | Racked Squat | Keep your chest up as you sit back and down |
| 19 | Racked Offset Squat | Keep your chest up as you sit back and down |
| 20 | Rotational Lift | Fully rotate away from Tonal |
| 21 | Rotational Chop | Fully rotate away from Tonal |
| 22 | Bulgarian Split Squat | Move your body closer to the bench |
| 23 | Incline Chest Press | Keep your core stronger during the movement |
| 24 | Bird Dog with Row | Keep your leg parallel to the floor |
| 25 | Pushup to plank | Keep hips up and body straight |
| 26 | Pillar Bridge | Keep hips up and body straight |
| 27 | Lateral Bridge | Keep hips up and body straight |
| 28 | Pushup to plank | Keep hips up and body straight |
| 29 | Pillar Bridge | Keep hips up and body straight |
| 30 | Lateral Bridge | Keep hips up and body straight |
| 31 | Barbell RDL | Drive hips back towards the wall behind you |
| 32 | Standing Lift | Keep your hips and torso stable during the lift |
| 33 | Suitcase Deadlift | Sit back and keep shins vertical |
| 34 | Neutral Grip Deadlift | Sit back and keep shins vertical |
| 35 | Single Arm Deadlift | Sit back and keep shins vertical |
| 36 | Barbell Deadlift | Sit back and keep shins vertical |
| 37 | Barbell RDL | Sit back and keep shins vertical |
| 38 | RDL | Sit back and keep shins vertical |

FIG. 6B

| | |
|---|---|
| < 30) && RepCountSinceSetResumed > 1 | C |
| ShoulderSlumpProbability > 0.61 && RepCountSinceSetResumed >= 2 | E |
| InclinePressElbowHighProbability > 0.96 && RepCountSinceSetResumed > 1 | |
| InclinePressElbowTooCloseProbability > 0.71 && RepCountSinceSetResumed > 1 | |
| SingleLegRdlBadFormScore > 2 | |
| SingleLegRdlBadFormScore > 2 | |
| AnkleKneeHipAngle > 170.75 && abs(SpatialPoseAngleRot) - 90) < 30 && RepCountSinceSetResumed > 1 | |
| AnkleKneeHipAngle > 170.75 && abs(abs(SpatialPoseAngleRot) - 90) < 30 | |
| AnkleKneeHipAngle > 170.75 && abs(abs(SpatialPoseAngleRot) - 90) < 30 && RepCountSinceSetResumed > 1 | |
| HipKneeAngleDifference > 14 && abs(abs(SpatialPoseAngleRot) - 90) < 15 && RepCountSinceSetResumed > 1 | |
| HipKneeAngleDifference > 14 && abs(abs(SpatialPoseAngleRot) - 90) < 15 && RepCountSinceSetResumed > 1 | |
| HipKneeAngleDifference > 14 && abs(abs(SpatialPoseAngleRot) - 90) < 15 && RepCountSinceSetResumed > 1 | |
| HipKneeAngleDifference > 14 && abs(abs(SpatialPoseAngleRot) - 90) < 30 && RepCountSinceSetResumed > 1 | |
| TransverseShoulderRotation < 166 && TransverseHipRotation < 153 && abs(90 - abs(SpatialPoseAngleY - 90)) < 30 && RepCountSinceSetResumed > 1 | |
| TransverseShoulderRotation < 156 && TransverseHipRotation < 143 && abs(90 - abs(SpatialPoseAngleY - 90)) < 30 && RepCountSinceSetResumed > 1 | |
| KneeHipKneeAngle > 20 && RepCountSinceSetResumed > 1 && abs(90 - abs(SpatialPoseAngleRot) - 90) < 30 | |
| InlineChestPressHipTorsoFlexionProbability > 0.565 && RepCountSinceSetResumed > 1 | |
| BirdDogWithRowLegsAngleDiff > 15 && BirdDogWithRowConfidence > 0.5 | |
| (5.22*MeanShoulderAnkleToHipSignedDistance -0.00976*MeanShoulderHipKneeAngle +5.1*MeanShoulderAnkleToHipSignedDeviation +3.84*MeanShoulderKneeTo | |
| (0.295*MeanShoulderAnkleToHipSignedDistance -0.00639*MeanShoulderHipKneeAngle +0.29*MeanShoulderAnkleToHipSignedDeviation +0.0527*MeanShoulderKn | |
| (5.63*MeanShoulderAnkleToHipSignedDistance -0.00649*MeanShoulderHipKneeAngle +5.45*MeanShoulderAnkleToHipSignedDeviation +0.779*MeanShoulderKnee | |
| (-1.94*MeanShoulderAnkleToHipSignedDistance -0.00595*MeanShoulderHipKneeAngle -2.32*MeanShoulderAnkleToHipSignedDeviation -0.716*MeanShoulderKnee | |
| (-0.727*MeanShoulderAnkleToHipSignedDistance +0.00579*MeanShoulderHipKneeAngle -0.424*MeanShoulderAnkleToHipSignedDeviation +0.231*MeanShoulderK | |
| (-4.37 MeanShoulderAnkleToHipSignedDistance +0.00514*MeanShoulderHipKneeAngle -4.41*MeanShoulderAnkleToHipSignedDeviation -3.08*MeanShoulderKneeT | |
| (HorizontalShoulderDistanceTraveled > 0.55 && abs(SpatialPoseAngleZ - 90) < 30 && abs(SpatialPoseAngleRot) -90) < 30) && RepCountSinceSetResumed > 1 | |
| LiftChopTorsoTwistProbability > 0.57 && LiftChopTorsoTwistConfidence > 0.9 && RepCountSinceSetResumed > 1 | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |
| ((SquattingDuringHingesStoopToSquatIndex > 0 && SquattingDuringHingesStoopToSquatIndex < 0.5) && SquattingDuringHingesKneeFlexionAngle > 80) && RepCou | |

EXERCISE GUIDANCE USING MULTI-MODAL DATA

CROSS REFERENCE TO OTHER APPLICATIONS

This application claims priority to U.S. Provisional Patent Application No. 63/417,052 entitled FORM FEEDBACK USING CAMERA DATA filed Oct. 18, 2022 which is incorporated herein by reference for all purposes.

BACKGROUND OF THE INVENTION

Strength training, also referred to as resistance training or weight lifting, is an important part of any fitness routine. Strength training promotes a healthier lifestyle by including the building of muscle, the burning of fat, and improvement of a number of metabolic factors including insulin sensitivity and lipid levels.

It would be an improvement to promote a more efficient and safe method of strength training. When performing physical exercise such as strength training, performing movements incorrectly may lead to injury, demotivation from strength training, or poor efficacy/earlier exhaustion. For example, a person may easily injure themselves if they perform a deadlift and twist their back. For example, a person may be unsure of how to perform an exercise and/or does not feel confident or safe when attempting to perform a movement due to the risk of injury may demotivate them from working out and being healthier. For example, a person performing movements incorrectly may reduce the efficacy of performing the exercise such that the user does not derive the benefits of performing the exercise.

BRIEF DESCRIPTION OF THE DRAWINGS

Various embodiments of the invention are disclosed in the following detailed description and the accompanying drawings.

FIG. 4 is an illustration of the pose domain.

DETAILED DESCRIPTION

Figure 1A:
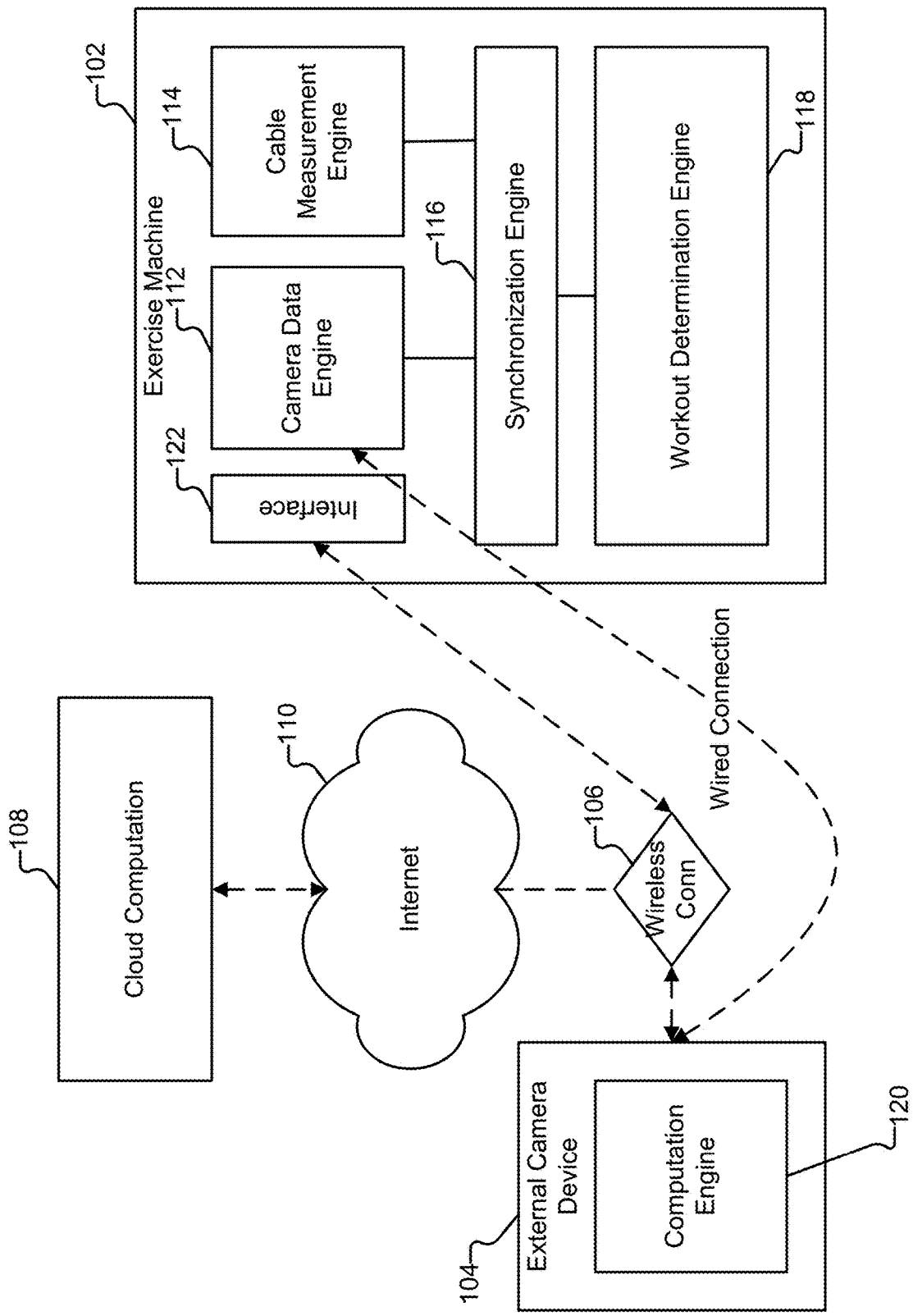
FIG. 1A illustrates an embodiment of a system for integrating and coordinating a movable/external camera device and a cable-based exercise machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A strength training machine may be improved by capturing video data of a performance of an exercise movement. The improvement may include providing guidance for exercise. As referred to herein, "guidance" without limitation includes form feedback, mobility assessment, stability assessment, repetition counting, determining ROM (range of motion), determining flexibility, determining strength, struggle detection, fatigue detection, and/or balance assessment. Traditional exercise machines such as exercise bikes may include an embedded camera, but suffer some limitations: camera technology evolves quickly, and embedded cameras that are difficult to replace may quickly become obsolete and/or of degrading quality relative to state-of-art in terms of frame rate/resolution/field of view especially considering a typical lifetime of the exercise machine, which may be upwards of a decade. Furthermore, a fixed embedded camera limits the types of perspectives that may be captured. For example, if a camera is embedded at a top of an exercise machine, then given its field of view, it may not be able to capture the user's lower body, only their upper body.

Integrating an external camera device with a cable-based exercise machine is disclosed. In one embodiment, a framework or architecture integrates a movable camera device, such as that on a mobile device or of a standalone external camera device, with a cable-based exercise machine such as a cable-based strength trainer. In one embodiment, external camera integration includes camera integration includes efficiently splitting computation between the movable camera device and trainer to ensure efficient communication. In one embodiment, movable camera integration includes batching of communications between a movable camera device and the trainer to minimize communication overheads.

Improved guidance/form feedback in a cable machine using a movable camera is disclosed. Without limitation, the context of guidance/form feedback may be adapted for other applications, such as repetition counting, assessments, determining ROM, determining flexibility, struggle detection, and fatigue detection.

The use of a movable camera allows for improved form feedback, in which video-based information is combined with cable-based information to provide improved information about a user. With finer-grained positional information for example, an improvement includes more advanced feedback on form, avoidance of injuries, improved muscle utilization, and guidance on movements that are performed without using the cables of the trainer. For example, a movable camera positioned to the side of the user may be used to obtain key positions of large body joints that allow form feedback for injury prevention, muscle utilization, and off-device moves.

Determining how to efficiently split computation between the trainer and movable external camera device grants the improvement of more efficient communication. Determining how to batch communication between the movable/external camera device and the trainer grants the improvement of more reduced communications overhead. Coordinating interaction and communication between a movable camera device with a trainer include embodiments of splitting computation/processing between the camera device and trainer granting the improvement of reduced CPU utilization on the trainer.

For example, in the context of form feedback, user joint key-points are generated on the movable camera device, where compute-intensive processing of these key-points is then performed on the trainer. For example, batching of key-points sent to the trainer at different workout phases grants the improvement of reduced communication overhead without affecting the accuracy of real-time form intelligence. Improving robustness is also disclosed, for example by correction of collected noisy key-points using smoothing, as well as embodiments of interpolation techniques.

Without limitation, form feedback is an example type of workout determination that may be made using a combination of vision-based and cable-based data. Various workout determinations may be made using vision-based and cable-based data. For example, the workout determinations may be made by training and deploying machine learning models on the exercise machine using a combination of different models for different types of form feedback. One example of output is that time stamps of incorrect form detected in a video stream captured by a movable camera device are detected, wherein then an alert is sent to the user for form improvement.

The ability to integrate the trainer with an external device such as a mobile phone has another improvement by enhancing and/or augmenting the capabilities of the trainer. For example, phone cameras improve year after year, and evolve much more quickly than a trainer, which may last over a decade. Optical properties of the mobile phone camera(s) may also be enhanced using new technologies including lidar, radar, sonar, infrared positioning/reckoning, imaging stereo depth positioning/reckoning, near-field positioning/reckoning, inertial measurement unit (IMU) positioning/reckoning, and/or satellite positioning/reckoning. An improvement is that the imaging capabilities are upgraded as users obtain current state-of-the-art phones for personal/work purposes, without relying on updating the trainer itself or purchasing a new trainer.

Integrating an exercise machine with a movable camera device also grants an improvement of augmenting the computational power of the trainer. For example, the computational power of the trainer may be fixed for the life of the trainer. By integrating a trainer with one or more external devices, computation is distributed across the trainer and the movable device and the computing power of the movable/external device such as a mobile phone may be leveraged to perform functions that may be difficult for the trainer to perform on its own with camera feeds and sensor data being received as streams of information. An improvement is that the overall computation resources are upgraded as users obtain current state-of-the-art phones for personal/work purposes, without relying on updating the trainer itself or purchasing a new trainer.

In one embodiment, computing resources of the external/movable camera device, including its processor, memory, network, storage, camera, sensors, and/or GPU (graphics processing unit) may be leveraged to augment the capabilities of the exercise machine/trainer. In this way, by distributing computing so that it occurs on the camera device external to the system, a modern camera and computing capabilities are brought to a trainer device which may, over time with replacement of the movable device, become relatively limited in terms of its available computational capacity and the types of processing it may be able to perform. That is, the use of movable/external camera devices allows for improved camera quality and increases in the amount of data collected over time, even if the trainer's hardware capabilities are surpassed.

FIG. 1A illustrates an embodiment of a system for integrating and coordinating a movable/external camera device and a cable-based exercise machine. An external camera device may capture video data of a user while they are working out to, for example, provide more advanced form feedback about the movements that they are performing. For example, form feedback may include whether they are hinging at the hips, their knees are coming too far forward over their feet, and/or whether they are keeping their back straight. The captured video information augments the cable-based measurements collected by the exercise machine, allowing for finer-grained information such as positional information about the user.

In one embodiment, the video information from the external camera device is used to help improve a user's performance, prevent/avoid injury, improve muscle utilization, and/or facilitate visual display of another view of what the user is doing while they are exercising. The captured video information may also allow determination of information of the user such as positional information when they are performing off-trainer moves, that is moves that do not involve using the cables of the exercise machine, such as pushups, sit ups, and yoga moves.

In one embodiment, computer vision is run on the captured video data to perform pose estimation, which may include determining a skeletal structure of the user and/or determine a "stick figure" of a user. Various angles may then be measured to determine correct or incorrect form. In one embodiment, the exercise machine includes a screen or display. The display may be configured to show a view of the mobile camera, which the user has set up to their side.

In the example of FIG. 1A, exercise machine (102) is a cable-based exercise machine, such as a cable-based strength trainer. As one example, the trainer is a digital strength trainer. In one embodiment, a digital strength trainer uses electricity to generate tension/resistance. Examples of electronic resistance include using an electromagnetic field to generate tension/resistance, using an electronic motor to generate tension/resistance, and using a three-phase brushless direct-current (BLDC) motor to generate tension/resistance.

The movable/external camera device integration and form detection and feedback techniques disclosed may be adapted without limitation to accommodate other types of exercise machines using different types of load elements, such as aerobic exercise machines and/or machines based on pneumatic cylinders, springs, weights, flexing nylon rods, elastics, pneumatics, hydraulics, and/or friction.

A digital strength trainer using electricity to generate tension/resistance may also be versatile by way of using dynamic resistance, such that tension/resistance may be changed nearly instantaneously. When tension is coupled to position of a user against their range of motion, the digital strength trainer may apply arbitrary applied tension curves, both in terms of position and in terms of phase of the movement: concentric, eccentric, and/or isometric. Furthermore, the shape of these curves may be changed continuously and/or in response to events; the tension may be controlled continuously as a function of a number of internal and external variables including position and phase, and the resulting applied tension curve may be pre-determined and/or adjusted continuously in real time.

As shown in FIG. 1A the exercise machine (102) includes an interface (122) to communicate with movable/external camera device (104). In one embodiment, the external camera device (104) is wirelessly coupled to the exercise machine over, for example, a local WiFi network (106) such as a WiFi network in a user's home. In one embodiment, the external camera device (104) is wired or tethered to the exercise trainer for example using USB (universal serial bus) or another wired interface. In this example, the external camera device (104) is movable, and the user may place it in various different positions for different viewpoints or perspectives. Examples of movable external camera devices include standalone camera devices, mobile phones with imaging capabilities, tablets, alternate/virtual reality sets, and/or webcams.

In one embodiment, the trainer includes an optional onboard camera. Using the disclosed framework, various camera capture configurations may be implemented, such as an onboard camera along with one or more external camera devices, external camera device only, and multiple external cameras without an onboard camera.

For example, in a case that the exercise machine (102) does not include an onboard camera, the external camera device (104) is the primary camera device. If the trainer (102) does have an onboard camera, in one embodiment the external camera device (104) provides an additional feed that supplements or augments a video feed from an onboard camera. This allows multiple angles and camera views to be captured. For example, the onboard camera may be used to provide a front view, while the external camera device (104) is positioned to capture a side view of the user. Different configurations may be used for different scenarios and applications.

For example, a front facing camera pointed at the user may be used for capturing video of a standing face pull exercise where the user is bringing the rope from the top towards their face. However, for other moves, such as deadlifts or off-machine moves, other angles of the user are beneficial to have, and in these cases, an external camera (104) is useful, for example to capture the portions of the body that the front facing camera would not, such as a side view or a user view from behind to capture their back and/or lower body.

As another example, a front facing camera either with an embedded onboard camera or by placing an external camera (104) in front of the user and/or in a receptable on the trainer is beneficial for performing repetition counting and determining body composition. A front facing camera (104) is also beneficial for some types of form feedback, such as knee valgus. A side camera (104) is beneficial for other moves such as squatting versus hinging on dead lifts.

One example of the movable camera device (104) is a mobile computing device such as a smartphone or tablet that has a set of optical sensors or cameras such as RGB cameras and/or depth sensing cameras. In this example case, the mobile device (104) may have a computational engine (120) which may be configured by a companion mobile app used in conjunction with the exercise machine (1012). In one embodiment, the app and computational engine (120) is used to facilitate linking or pairing between the mobile device (104) and the exercise machine (102). As another example, the external camera device is a standalone camera device.

The following is an example of setting up the external camera device (104) for use with the exercise machine (102). As one example, the trainer displays a visual marker such as a QR (Quick Response) code. The user uses the camera on their mobile device (104) for example via the mobile app on the user's phone, or software on a standalone external camera device to scan the QR code. Various setup parameters, such as backend credentials, local WiFi settings such as SSID/password and login information are shared via the QR code, which allows for example, a port to the trainer (102) to be opened directly from the movable external camera device (104). In this way, in which the external camera device opens a port to the trainer using setup parameters received via scanning of a QR code, friction in the setup experience is removed.

As another example of a setup, suppose that the user would like to use the camera on their mobile smart phone (104) to capture video information to be used by the trainer (102). In this example, the mobile phone has installed a mobile app that is a companion to the trainer. The user logs into their mobile app with their account. In this example, the user's trainer is already registered or otherwise associated with their account. When the user logs into the mobile app, their trainer is identified. In this example, the user selects, within the mobile app, the option to enable a vision/video capture feature. In response, a synchronization step is performed. If the mobile phone (104) and the trainer (102) are connected to the same WiFi network (106), then, in one embodiment, the mobile app scans the local network for the trainer and connects to it, for example using the information about the trainer (102) that is associated with the user's account. If a standalone external camera device is used that is to be configured for the first time, the WiFi connection information may be obtained via scanning of a QR code or via manual entry by the user, as described above.

Once connected with the exercise machine, in one embodiment, suggestions or recommendations on how to place or position the external camera device (104) are provided via the mobile app and/or on a display of the exercise machine, for example to keep the movable camera (104) at least several feet away.

As described above, the external camera device (104) may include computation engine (120), which may include one or more CPUs and/or GPUs able to perform various types of processing, such as computer vision and machine learning. Computations based on the video information may be split between the external camera device and the trainer. In one embodiment, the video information is processed on the external camera device (104), where it is transformed into a set of event data that is sent to the trainer (102) for further processing, for example combining with cable-based measurements collected via sensors on the exercise machine. In one embodiment, raw video data is sent to the trainer (104) for processing. In one embodiment, a portion of the video information is sent to a backend or cloud entity (108) for processing. In one embodiment, the cloud computation is backend on which computation processing may be performed. Such a backend may be hosted on a cloud service provider such as Amazon Web Services (AWS), Google Cloud, and/or Microsoft Azure. In this example, the exercise machine (102) and/or external camera device (104) communicate with the cloud computation entity (108) over a network such as the Internet (110) without limitation. That is, portions of the processing of the raw video data captured by the external camera device may be performed in different locations such as the external camera device (104), exercise machine (102), and/or cloud (108).

Communication of information among the entities of the system may also be bi-directional. In one embodiment, the trainer (102) sends data to the external camera device (104) to perform real time processing. The trainer (102) may also receive information from the external camera device (104) to determine feedback. In one embodiment, to generate a post-workout summary, the trainer (102) and/or external camera device (104) transmit data to the cloud (108), where the cloud (108) generates the summary and serves it for post-workout analysis. Further details regarding routing of information within the architecture described herein, for example among the external camera device (104), trainer (102), and the cloud (108) as different compute locations or sources of compute, to effectively run various types of processing and computations are described herein.

In one embodiment, vision-based data is received via camera data engine (112) of exercise machine (102). In one embodiment, vision or imaging-based information includes raw video data, RGB (Red Green Blue) data, depth based data, lidar (laser imaging, detection, and ranging) data, radar data, sonar data, and other spatial data. Vision-based information also includes information generated from captured raw data, such as key points from pose estimation and optical flow to capture motion.

Cable-based measurements are received via cable measurement engine (114) of trainer (102). In one embodiment, cable-based measurements such as cable lengths, cable speeds, and/or weight/tension are obtained using various sensors, such as the encoders described herein.

Synchronization engine (116) is configured to map video information based on the data received from the external camera device (104) and/or other cameras with cable-based measurements. In one embodiment, the synchronization is performed via time stamps. After synchronization, the corresponding portions of the vision-based and cable-based data are combined.

Workout determination engine (118) is configured to perform a workout determination based at least in part on both the imaging-based information and the cable-based measurements. In the context of form feedback, in one embodiment, the workout determination engine (118) is configured to determine feedback based on detected incorrect form. Form feedback may be provided to a user in a variety of ways. In one embodiment, feedback is presented on the display of the exercise machine and/or via auditory. As one example, a video stream from the external camera device (104) is displayed on the trainer (102), where the portion of the body that has incorrect form is highlighted. As another example, a feed of the user is displayed side by side with the coach, allowing the user to self-correct. As another example, text notes are displayed on the screen.

Pose Estimation and Key Points. In one embodiment, an exercise trainer is coupled with a mobile phone (104) that has a camera. The phone camera may be used to capture video of the user performing an exercise. In one embodiment, the mobile device (104) is configured to perform pose estimation from the captured video for example using computation engine (120). This includes generating, using the local computational and processing power of the mobile device and/or the trainer (104) and/or the cloud (108), key points. "Key points" as referred to herein represent various points on the user's body, such as a joint, like an elbow, shoulder, hip, knee. "Generating a key point" as referred to herein include estimating/determining in three-dimensional space the location of a key point, for example determining that a user's right knee key point is at <0.21, 1.23, 2.23>. Note that connecting a user's key points may result in a "stick figure" model of the user. In one embodiment, key points are generated using computer vision. In one embodiment, a mobile device (104) periodically transmits the generated key points to the trainer (102). "Pose estimation" as referred to herein includes generating a canonical set of key points, for example a set of 32 key points that cover a substantive portion of the human anatomy. Without limitation different numbers of key points, for example 26 key points, may be the count of the canonical set. Pose estimation may also include tracking the canonical set of key points over a period of time and/or at a frame rate, for example at 30 fps.

In one embodiment, the trainer (102) uses the key points received from the mobile camera device (104) as input to a machine learning model that runs on the trainer (102) such as in a processing sandbox. The imaging or vision-based information/key points are combined with the cable-based measurements, for example after being synchronized by synchronization engine (116) to perform a determination of whether correct or incorrect form has been detected by workout determination engine (118). In one embodiment, the cloud entity (108) is also accessed, for example, to obtain model parameters for determining form feedback.

In one embodiment, the interaction among the various entities in the architecture of FIG. 1A is in real-time. For example, pose estimation occurs live, as video is being processed. In one embodiment, rather than the raw video feed being sent directly to the exercise machine (102), some processing is performed on the mobile camera device (104) and thus the processing of the captured video is distributed across multiple entities.

For example, suppose that a user is doing a squat, and has placed their movable camera device (104) to their side, at an angle from which the user is visible and allowing the side of their body to be captured. From the captured video, the movable camera device (104) generates a set of key points from captured video frames, a type of video-based event information. For example, the key points correspond to different points on the human user. For example, one key point is generated that corresponds to the user's face, for example their nose. Key points are also generated that correspond to the user's feet. Key points are also generated at joints identified in the video data, such as the wrist, knees, hips, and/or elbows. Each key point is associated with a set of coordinates, indicating the position of the key point in space at a point in time, for example when the frame was captured). Tracking of the position of key point over time/frames may be used to determine how a joint is moving over the course of a repetition.

The event information generated by the movable camera device (104) from the raw video information, such as the key points, are transmitted to the trainer (102) for further processing, for example over WiFi or Bluetooth. In one embodiment, the key points generated at the external camera device (104) are continuously sent to the trainer (102) as they are generated. Processing of the key points is then performed at the trainer (102). In this example, the external camera device (104) is configured to generate key points, and the trainer (102) is configured to perform processing on the key points.

Figure 1B:
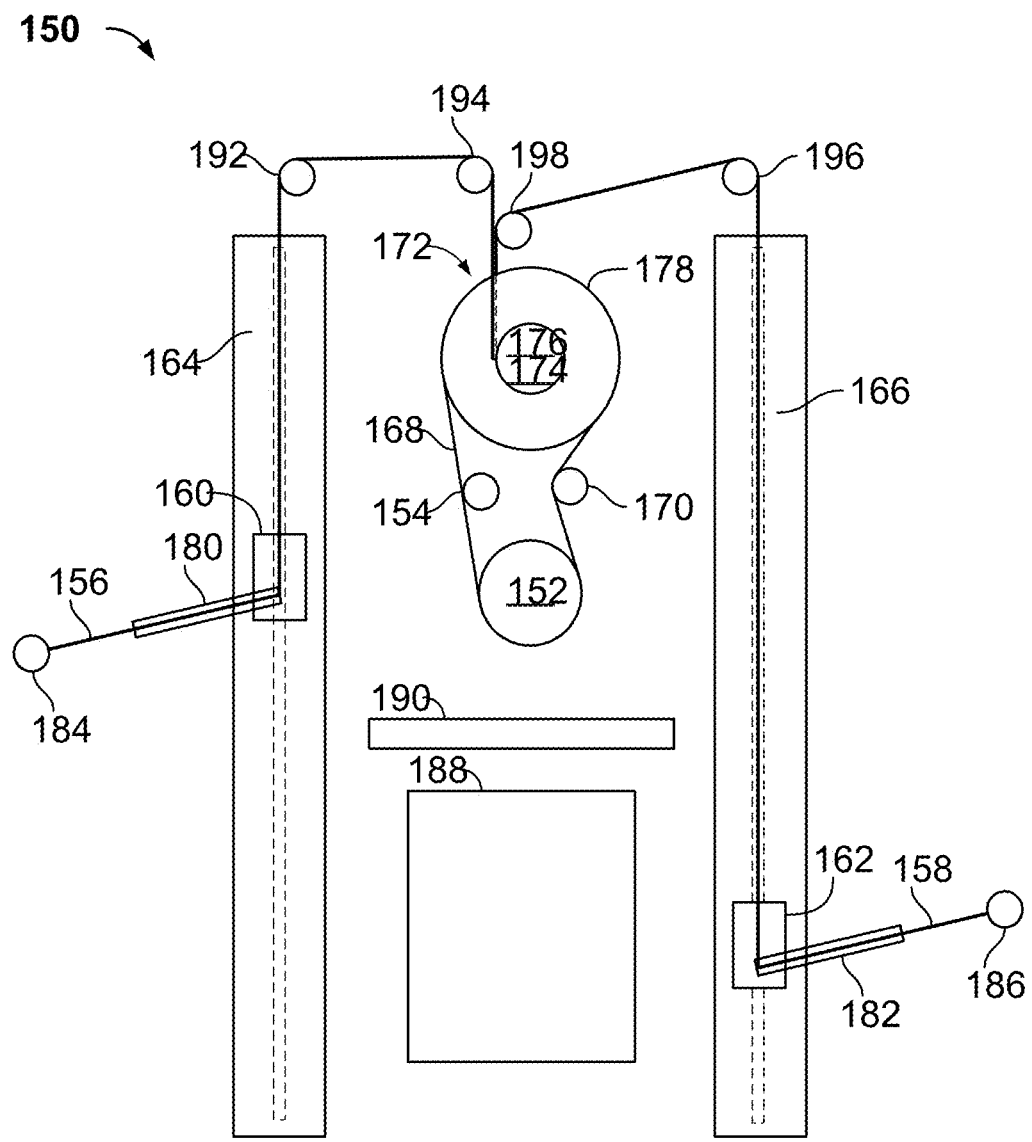
FIG. 1B illustrates a front view of one embodiment of an exercise machine.

Digital Strength Trainer Overview. FIG. 1B illustrates a front view of one embodiment of an exercise machine. In one embodiment, exercise machine 150 of FIG. 1B is an example or alternate view of the exercise machine 102 of FIG. 1A. In this example, exercise machine (150) includes a pancake motor (152), a torque controller coupled to the pancake motor, and a high resolution encoder (154) coupled to the pancake motor. As used herein, a "high resolution" encoder refers to an encoder with 30 degrees or greater of electrical angle. In this example, two cables (156) and (158) are coupled respectively to actuators (184) and (186) on one end of the cables. Examples of actuators include handles, bars, etc.) The two cables (156) and (158) are coupled directly or indirectly on the opposite end to the motor (152). While an induction motor may be used for motor (152), a BLDC motor may also be used for its cost, size, weight, and performance. In one embodiment, a high resolution encoder assists the system to determine the position of the BLDC motor to control torque. While an example involving a single motor is shown, the exercise machine may include other configurations of motors, such as dual motors, with each cable coupled to a respective motor.

In one embodiment, the motor is driven by a motor controller circuit, which in one embodiment includes a processor, inverter, pulse-width-modulator, and/or a Variable Frequency Drive (VFD). In one embodiment, a filter is configured to digitally control the controller circuit based on receiving information from the cable and/or actuator.

Sliders (160) and (162) may be respectively used to guide the cable (156) and (158) respectively along rails (164) and (166). The exercise machine in FIG. 1B translates motor torque into cable tension. As a user pulls on actuators (184) and/or (186), the machine creates/maintains tension on cable (156) and/or (158). The actuators (184, 186) and/or cables (156, 158) may be actuated in tandem or independently of one another. In one embodiment, electronics bay (188) is included and has the necessary electronics to drive the system. In one embodiment, fan tray (190) is included and has fans that cool the electronics bay (188) and/or motor (152).

Motor (152) is coupled by belt (168) to an encoder (154), an optional belt tensioner (170), and a spool assembly (172). In one embodiment, motor (152) is an out-runner, such that the shaft is fixed and the motor body rotates around that shaft. In one embodiment, motor (152) generates torque in the counter-clockwise direction facing the machine, as in the example in FIG. 1B. Motor (152) has teeth compatible with the belt integrated into the body of the motor along the outer circumference. Referencing an orientation viewing the front of the system, the left side of the belt (168) is under tension, while the right side of the belt is slack.

The belt tensioner (170) takes up any slack in the belt. An optical rotary encoder (154) coupled to the tensioned side of the belt (168) captures all motor movement, with significant accuracy because of the belt tension. In one embodiment, the optical rotary encoder (154) is a high-resolution encoder. In one embodiment, a toothed belt (168) is used to reduce belt slip. The spools rotate counter-clockwise as they are spooling cable/taking cable in, and clockwise as they are unspooling/releasing cable out.

The encoders described above are examples of sensors of the exercise machine. In one embodiment, encoders are used to measure cable lengths (e.g., left and right cable lengths in this example), cable speeds, weight (tension), etc. One example of an encoder is a position encoder; a sensor to measure position of the actuator or motor. Examples of position encoders include a hall effect shaft encoder, greycode encoder on the motor/spool/cable, an accelerometer in the actuator/handle, optical sensors, position measurement sensors/methods built directly into the motor, and/or optical encoders.

In one embodiment, an optical encoder is used with an encoding pattern that uses phase to determine direction associated with the low resolution encoder. As another example, a magnetic encoder is used to determine cable position/length. Other mechanisms that measure back-EMF (back electromagnetic force) from the motor in order to calculate motor position may also be used; a motor power sensor; a sensor to measure voltage and/or current being consumed by the motor; a user tension sensor; a torque/tension/strain sensor and/or gauge to measure how much tension/force is being applied to the actuator by the user.

In one embodiment, a tension sensor is built into the cable. Alternatively, a strain gauge is built into the motor mount holding the motor. As the user pulls on the actuator, this translates into strain on the motor mount which is measured using a strain gauge in a Wheatstone bridge configuration. In another embodiment, the cable is guided through a pulley coupled to a load cell. In another embodiment, a belt coupling the motor and cable spool or gearbox is guided through a pulley coupled to a load cell. In another embodiment, the resistance generated by the motor is characterized based on the voltage, current, or frequency input to the motor.

Spool assembly (172) comprises a front spool (174), rear spool (176), and belt sprocket (178). The spool assembly (172) couples the belt (168) to the belt sprocket (178), and couples the two cables (156) and (158) respectively with spools (176) and (174). Each of these components is part of a low profile design. In one embodiment, a dual motor configuration not shown in FIG. 1B is used to drive each cable (156) and (158). In the example shown in FIG. 1B, a single motor (152) is used as a single source of tension, with a plurality of gears configured as a differential are used to allow the two cables/actuators to be operated independently or in tandem. In one embodiment, spools (176) and (174) are directly adjacent to sprocket (178), thereby minimizing the profile of the machine in FIG. 1B.

As shown in FIG. 1B, two arms (180, 182), two cables (156, 158) and two spools (176, 174) are useful for users with two hands, and the principles disclosed without limitation may be extended to three, four, or more arms (180) for quadrupeds and/or group exercise. In one embodiment, the plurality of cables (156, 158) and spools (176, 174) are driven by one sprocket (178), one belt (168), and one motor (152), and so the machine (150) combines the pairs of devices associated with each user hand into a single device. In one embodiment, each arm is associated with its own motor and spool.

In one embodiment, motor (152) provides constant tension on cables (156) and (158) despite the fact that each of cables (156) and (158) may move at different speeds. For example, some physical exercises may require use of only one cable at a time. For another example, a user may be stronger on one side of their body than another side, causing differential speed of movement between cables (156) and (158). In one embodiment, a device combining dual cables (156) and (158) for a single belt (168) and sprocket (178) retains a low profile, in order to maintain the compact nature of the machine, which can be mounted on a wall.

In one embodiment, pancake style motor(s) (152), sprocket(s) (178), and spools (176, 174) are manufactured and arranged in such a way that they physically fit together within the same space, thereby maximizing functionality while maintaining a low profile. As shown in FIG. 1B, spools (176) and (174) are respectively coupled to cables (156) and (158) that are wrapped around the spools. The cables (156) and (158) route through the system to actuators (184) and (186), respectively.

The cables (156) and (158) are respectively positioned in part by the use of "arms" (180) and (182). The arms (180) and (182) provide a framework for which pulleys and/or pivot points may be positioned. The base of arm (180) is at arm slider (160) and the base of arm (182) is at arm slider (162). In one embodiment, each arm is configurable to be translated vertically, up and down a rail/track via its arm slider, which may be locked in various positions. In one embodiment, each arm is configurable to pivot vertically. In one embodiment, each rail/track is rotatable, thereby allowing the arms to be configured to pivot horizontally as well.

The cable (156) for a left arm (180) is attached at one end to actuator (184). The cable routes via arm slider (160) where it engages a pulley as it changes direction, then routes along the axis of rotation of track (164). At the top of rail/track (164), fixed to the frame rather than the track, is pulley (192) that orients the cable in the direction of pulley (194), that further orients the cable (156) in the direction of spool (176), wherein the cable (156) is wound around spool (176) and attached to spool (176) at the other end.

Similarly, the cable (158) for a right arm (182) is attached at one end to actuator (186). The cable (158) routes via slider (162) where it engages a pulley as it changes direction, then routes along the axis of rotation of rail/track (166). At the top of the rail/track (166), fixed to the frame rather than the track is pulley (196) that orients the cable in the direction of pulley (198), that further orients the cable in the direction of spool (174), wherein the cable (158) is wound around spool (174) and attached to spool (174) at the other end.

One use of pulleys (194, 198) is that they permit the respective cables (156, 158) to engage respective spools (176, 174) "straight on" rather than at an angle, wherein "straight on" references being within the plane perpendicular to the axis of rotation of the given spool. If the given cable were engaged at an angle, that cable may bunch up on one side of the given spool rather than being distributed evenly along the given spool. In the example shown in FIG. 1B, pulley (198) is lower than pulley (194). This demonstrates the flexibility of routing cables. In one embodiment, mounting pulley (198) leaves clearance for certain design aesthetic elements that make the machine appear to be thinner.

As shown in the above examples, the exercise machine/appliance passes a load/resistance against the user via one or more lines/cables, to a grip(s) (examples of an actuator) that a user displaces to exercise. A grip may be positioned relative to the user using a load arm and the load path to the user may be steered using pulleys at the load arm ends, as described above. The load arm may be connected to a frame of the exercise machine using a carriage that moves within a track that may be affixed to the main part of the frame. In one embodiment, the frame is firmly attached to a rigid structure such as a wall. In one embodiment, the frame is not mounted directly to the wall. Instead, a wall bracket is first mounted to the wall, and the frame is attached to the wall bracket. In one embodiment, the exercise machine is mounted to the floor. The exercise machine may be mounted to both the floor and the wall for increased stability. In one embodiment, the exercise machine is a freestanding device.

In one embodiment, the exercise machine includes a media controller and/or processor, which monitors/measures user performance (for example, using the one or more sensors described above), and determines loads to be applied to the user's efforts in the resistance unit (e.g., motor described above). Without limitation, the media controller and processor may be separate control units or combined in a single package. In one embodiment, the controller is further coupled to a display/acoustic channel that allows instructional information to be presented to a user and with which the user interacts in a visual manner, which includes communication based on the eye such as video and/or text or icons, and/or an auditory manner, which includes communication based on the ear such as verbal speech, text-to-speech synthesis, and/or music. Collocated with an information channel is a data channel that passes control program information to the processor which generates, for example, exercise loading schedules. In one embodiment, the display is embedded or incorporated into the exercise machine, but need not be (e.g., the display or screen may be separate from the exercise machine, and may be part of a separate device such as a smartphone, tablet, laptop, etc. that may be communicatively coupled (e.g., either in a wired or wireless manner) to the exercise machine). In one embodiment, the display is a large format, surround screen representing a virtual reality/alternate reality environment to the user; a virtual reality and/or alternate reality presentation may also be made using a headset. The display may be oriented in landscape or portrait.

In one embodiment, the appliance media controller provides audio information that is related to the visual information from a program store/repository that may be coupled to external devices or transducers to provide the user with an auditory experience that matches the visual experience. Control instructions that set the operational parameters of the resistance unit for controlling the load or resistance for the user may be embedded with the user information so that the media package includes information usable by the controller to run the machine. In this way a user may choose an exercise regime and may be provided with cues, visual and auditory as appropriate, that allow, for example, the actions of a personal trainer to be emulated. The controller may further emulate the actions of a trainer using an expert system and thus exhibit artificial intelligence. The user may better form a relationship with the emulated coach or training professional, and this relationship may be encouraged by using emotional/mood cues whose effect may be quantified based on performance metrics gleaned from exercise records that track user performance in a feedback loop using, for example, the sensor(s) described above.

Figure 2:
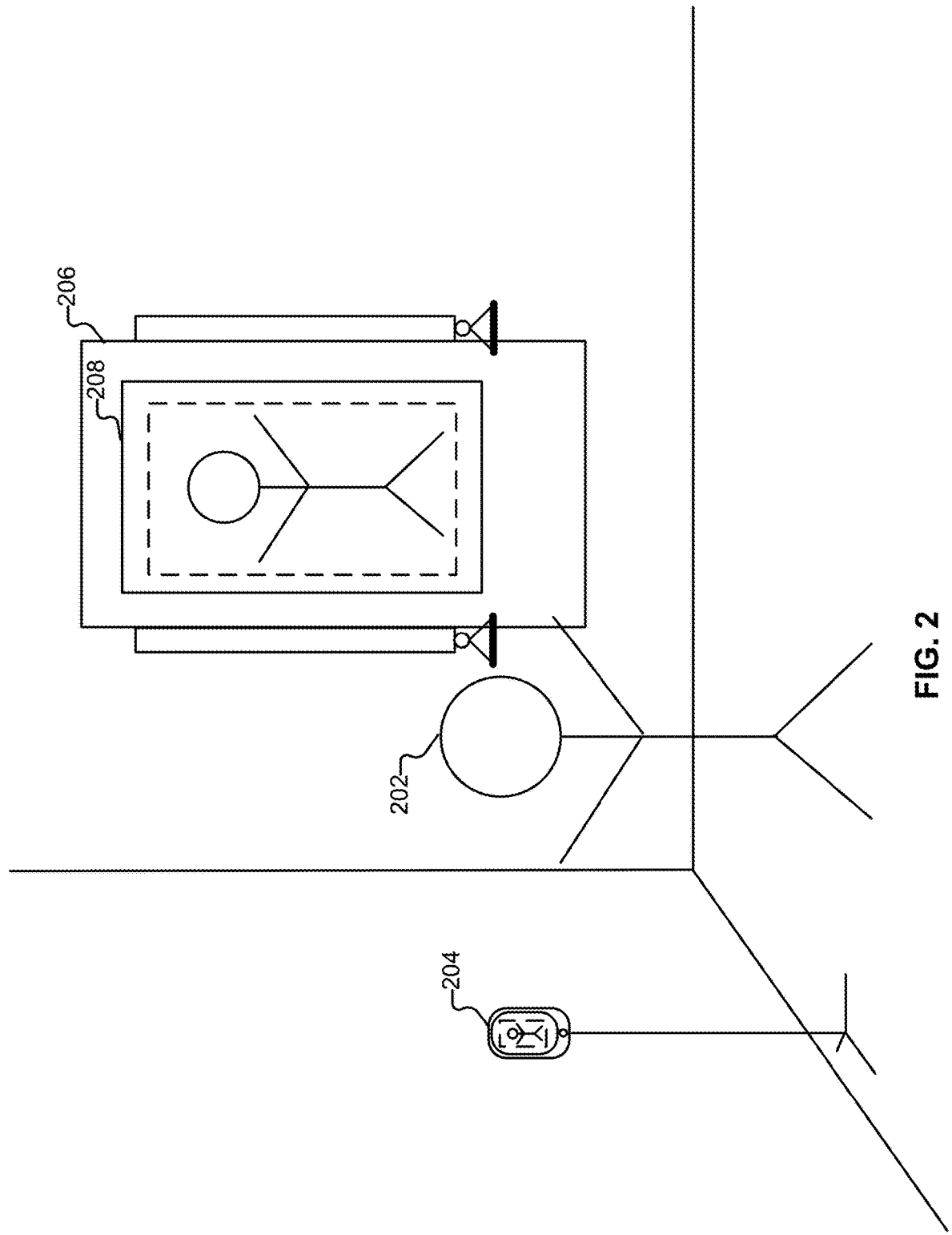
FIG. 2 illustrates an example of setting up an external movable camera device with a trainer.

FIG. 2 illustrates an example of setting up an external movable camera device with a trainer. The user (202) positions their camera (204), such as at a 90-degree angle relative to the strength trainer (206). In one embodiment, during this process, the movable camera device (204) is capturing a video stream that is sent to the trainer (206) as part of a setup process.

In one embodiment, the trainer is configured to display, on its screen (208), the video feed from the movable camera device as it is being positioned during setup, for example to mirror what is being observed by the movable camera device. In one embodiment, the camera displays a visual indication to identify whether the camera has been positioned appropriately.

For example, if all of the user's body parts are within the camera's field of view—an example of correct positioning, then a green rectangle is displayed, where the green rectangle may be shown on the mobile camera device (204), if it has a screen, and also on the trainer (206), so that the user (202) can move themselves and/or the movable camera device accordingly. If the user and/or camera are not appropriately positioned, a red rectangle may be shown.

In one embodiment, a position of the external camera (204) is recommended to the user (202) for example via the external camera device (204) and/or the exercise machine (206), such as to the side with respect to the exercise machine. Other types of indications or feedback of correct/incorrect positioning of the external camera device may be provided for example using check marks, audio cues, or text cues. Once set up, the user (202) may then begin working out.

The following are further details and embodiments of setting up the external camera device/positioning the camera appropriately, such as additional embodiments of providing feedback to a user of how to position the movable camera device that is external to the trainer. As one example, an image, such as a fixed image or QR code that has directionality, for example in depth, may be placed on the trainer (206). The camera (204) is then placed to see that image, wherein, in one embodiment, a live feed of the camera is displayed (208), allowing the user (202) to see the live video to adjust the position of the external camera (204), which is then used to determine the position of the camera (204) relative to the trainer (206).

In one embodiment, the relationship between distance, angle, and or height between the external camera device (204) and the trainer (206) is determined. In one embodiment, the relative position of the camera (204) to the trainer (206) is one component of setting up the camera, which includes the aforementioned determination of whether the user (202) is within the field of view of the external camera device (204). In this way, the relationship between the external camera device (204) and the user (202), as well as the relationship between the external camera device (204) and the strength trainer (206), are used in determining whether the camera (204) is properly positioned.

Leveraging the imaging sensors of a (204) standalone external movable camera or a user's personal mobile device allows for acquisition of video data at scale, where such data may be used to perform various tasks, such as pose estimation, as input or training data to machine learning models to power features like computer vision. For example, with respect to form feedback, the integration with movable camera devices and accessories allows for the collection of large volumes of data in a multitude of environments with various different types of good and bad form across different types of users.

There are further improvements to utilizing an external camera device (204). In addition to augmenting cable-based measurements with video data, other types of augmentation are also facilitated by the use of an external camera device. In one embodiment, the video information captured by the external camera device is used to perform pose estimation using computer vision. The cost of computer vision processing may be computationally expensive, and tax the hardware/computing power of the trainer (206). In one embodiment, the computing is distributed across the trainer (206) and the external camera device (204).

In one embodiment, the external camera device (204) streams key points to the exercise machine (206) as they are being generated from captured imaging data. In one embodiment, key points are batched together, and a batch of key points is sent to the trainer (206). A batch of key points may be sent periodically. As another example, key point information is transmitted at specific points, or in response to the occurrence of certain events, such as at the end of a specific phase such as the end of a concentric or eccentric phase of a workout movement. For example, the trainer, which is configured with logic to determine when phases of a rep occur by for example using cable-based measurements, collects the key point data in part by requesting, at the end of completion of a phase of a rep, the movable camera (204) device to provide a batch of key point data.

The batching provides various benefits and improvement. For example, the batching reduces performance issues. As one example challenge addressed by batching, sending key point information, as it is being generated may result in high CPU utilization, as it may use a network interface on the trainer where for example there may be a single network interface that is not only used for WiFi, but also other protocols such as Bluetooth. Intelligently batching the frame-derived information at different workout phases, for example at the end of a concentric or eccentric workout movement phase, or at fixed points of communication to the trainer reduces the burden on the CPU, as compared to sending real-time, frame by frame information to the trainer.

In one embodiment, batching is time-based. For example, given a workout, the average phase duration is determined. When a workout starts on a trainer (206), the timestamp of when the workout started is also sent to the external camera device (204), so that the external camera device is aware that a workout has started and that key points corresponding to reps should be generated. The timestamps of the average or expected phase durations are also transmitted. For example, a program or workout may be executed according to a fixed timeline, where certain events, such as warmup periods and/or transition periods between sets, are scheduled to occur at known points in time relative to the start of the workout. In this way, the external camera device (204) is also aware of when different events in a workout are to occur, for example when the user is performing an exercise on the trainer and/or when they are exercising off the trainer.

In one embodiment, the trainer (206) sends information to the external camera (204) device indicating when certain workout events have occurred and/or are expected to occur, which the external camera device (204) then uses to determine when to transmit a batch of key point information, for example to group together a batch of key points pertaining to a specific phase of a rep.

In one embodiment, the trainer (206) sends an indication, for example a timestamp, to the external camera device (204) indicating when a workout has started, so that the external camera device is aware that the workout has started. As another example, if the trainer is in the field of view of the camera of the external camera device, then the trainer also indicates the start of the workout to the external camera device via a visual cue and/or any other cue that is observable by the camera device displayed on the screen (208) of the trainer.

In one embodiment, the trainer (206) is configured to cause the display to go blank when the workout starts. The external camera device (204) is configured to monitor for such visual events, which may be mapped to different types of workout events, where in this case, in response to detecting the blanking of the screen, the external camera is now aware that the workout has started. In one embodiment, in addition to registering a timestamp for the start of a workout, or determining how and when to batch information, the visual cue may be used to indicate to the user that they are being recorded.

In one embodiment, the trainer (206) also signals to the external camera device (204) an indication that a workout has ended. In addition to the start and end of a workout, various other information may be transmitted from the trainer to the external camera device, such as when a certain milestone has been reached within a workout, when reps have started or ended, and/or when a set has started or ended. The movable camera device (204) then uses portions of such information to determine how and when to send video-based information to the exercise machine.

Improving robustness of frame-based information. As described herein, the imaging or vision-based information includes data derived from video frames captured by the external camera device (204). However, there may be issues with frames, such as missing frames and bad frames. For example, when capturing frames or transmitting data, there may be issues with dropped frames or jerkiness, which in turn impacts the quality of the vision-based information.

In one embodiment, smoothing is performed to address the issue of bad frames. In one embodiment, smoothing is performed by the trainer (206) on the received key point data, for example, to avoid detection of jerky behavior. In one embodiment, a set of key points is generated from a corresponding video frame. That set of key points is identified by an identifier of the video frame from which it was generated. In one embodiment, the key points transmitted to the trainer are also tagged with the identifier of the frame from which they were derived. In one embodiment, the trainer and/or external camera device maintains a rolling average of a window of frames for example the previous 10 frames. As referred to herein, "smoothing" comprises filtering data. One example of smoothing is maintaining the average values for key points over the last ten frames. Different size windows and different aggregate values may be used.

In one embodiment, to address the issue of dropped frames, interpolation is performed. As referred to herein, "interpolation" comprises constructing new data points between known data points at appropriate timestamps. For example, as part of processing key points at the exercise machine, the exercise machine is configured to perform interpolation to generate missing points. For example, suppose that there is not key point data for frame T, but the trainer has received key points for frame T−1 and frame T+1. The trainer is configured to use the key point data from frame T−1 and frame T+1 to interpolate or generate synthetic key point data for frame T. As one example, an interpolated position of a joint, indicated by a key point value, at frame T is computed assuming that a rate of motion is constant between the frames T−1 and frames T+1.

In one embodiment, to prevent frame issues from negatively impacting the quality of workout determinations, vision-based information is discarded, quarantined, and/or otherwise unused if there are an insufficient number of frames worth of data. For example, if a drop in WiFi occurs, this may result in key point data transmitted from the external camera device (204) not arriving at the trainer (206). Suppose that form feedback is to be provided at the end of a rep, prior to the user progressing onto a next step. At the point at which the form feedback is to be determined, an amount of available vision-based, video frame-derived information is determined.

For example, if the amount of available information is less than a threshold number of frames of data, for example ten frames worth of data, then all of the key point data corresponding to the rep that had just been completed is discarded. Other threshold numbers of frames may be used. For example, the threshold may be determined based on the frame rate or frames per second captured. As one example, suppose a fixed frame rate of 23 frames per second or 30 frames per second. A typical repetition is one to three seconds. If a threshold of 10 frames worth of data is used, then if this threshold is not met, this indicates that not even half of a second's worth of information was received for the repetition. In this case, the vision-based information is discarded and not used in performing a workout determination. Instead, for example, the trainer reverts to a default mode of using cable-based measurements independently of the vision-based data.

In one embodiment, the exercise machine uses the (smoothed) batch of data to make a determination of whether correct or incorrect form is detected from the received batch of key points. In one embodiment, the determination is made prior to the starting of the next repetition. If incorrect form is detected, then an alert or notification is immediately triggered on the trainer in response.

In one embodiment, to make the workout determination of correct/incorrect form, key point information received from the external camera device is combined with cable-based measurements collected via sensors during the performance of an exercise. For example, when performing a squat, the user uses the arms of the trainer to perform the squat, including performing the squat while holding the handles/actuators of the exercise machine, where, as they rise up, they are working against the resistance provided by the motor in the trainer, which is attempting to spool the cables back in.

In one embodiment, the cable-based measurements are used to determine for example the number of repetitions performed, the user's range of motion, and/or the user's speed. In addition, key points are also being received from the external camera device. For example, the external camera device transmits the key points to the trainer over WiFi using, for example, the webRTC protocol.

To determine form feedback for the squat being performed by the user, for example whether the user has correct or incorrect form for a rep of a squat that they are performing or have just performed, the vision-based measurements and the cable-based measurements are synchronized, combined, aligned, and/or otherwise associated with each other. For example, a portion of the key points in the received key points is mapped to a corresponding portion cable-based measurements that occurred at the same time.

In one embodiment, timestamp-based synchronization is performed. In one embodiment, key-points that are generated on the external camera device are timestamped. The cable-based measurements are also timestamped at the trainer according to a synchronized timing scheme or, for example, an offset or difference between the time on the external camera device and the trainer is used to align vision and cable-based measurements. The key point samples and cable-based measurement samples with the same or similar (within a threshold) timestamp values are matched together.

Identifying a subset of relevant video-based information for evaluation. In one embodiment, form detection is performed with respect to repetitions, in which case imaging-based information received outside of a repetition may be of less relevance in some cases. Better synchronization may be facilitated in part by limiting key point generation to only relevant video frames, thereby saving resources by not needing to perform key point generation on non-relevant video frames. In one embodiment, for timestamp-based synchronization, signals indicating the start and/or end of a repetition are transmitted from the trainer to the external camera device, as described above. The start and/or end signals, which may also be associated with corresponding timestamps, are used to identify cutoff timestamps. For example, the repetition-end signal is used to identify the start and end of what video data is evaluated or under consideration for a particular repetition. Further processing, such as pose estimation is then, for example, limited to that video data identified as being under consideration for a particular repetition.

In one embodiment, synchronizing vision-based information from an external camera device with cable-based measurements collected at an exercise machine does not require timestamps, and may be used independently of, or in conjunction with, the timestamp-based synchronization described above. Alignment is performed by matching characteristics of the vision-based information/key points with characteristics of the cable-based measurements. In one embodiment, cable-based measurements are used to determine a maxima-minima of the cable motion. The key point data matching to the maxima and/or minima are used to determine a reference point for aligning key point data to the cable-based measurements.

In one embodiment, a key point includes 3D coordinate information (such as X-axis, Y-axis, and Z-axis coordinates) of where a key point (for example hip, knee, elbow, wrist) on the person is at a particular point in time, which is identified by a corresponding frame identifier. For example, suppose that a user is performing a bench press, a movement known to the trainer. The user, as part of performing the exercise, may cause the cable position to retract/extend in and out of the arm, which is reflected in the cable measurement data. The key points corresponding to the hands/wrists of the user, determined from the captured video data, may also show motion/change in position corresponding to the extension/retraction. The change in the coordinates of position of key points is mapped to corresponding changes in position of the cable to synchronize the vision-based measurements with the cable-based measurements. In this way, the motion/changes in position detected in the key point data is mapped with motion/changes in position detected in the cable-based measurement.

In one embodiment, the cable data such as cable position data measured at the trainer is transmitted to the external camera device, where the real-time cable information is maintained on the external camera device. The key points are generated from video frames captured by the external camera device. Corresponding subsets of the cable data and key points are used to match video frames to real-time cable data.

In one embodiment, the key points are sent to the exercise machine, where the exercise machine performs the above synchronization of vision-based and cable-based information. In one embodiment, the external camera device transmits the live video feed to the trainer. For example, the trainer displays the live video feed on the display of the trainer in a "mirror" mode, where the user can see themselves from the side view while performing the exercise. In one embodiment, the trainer performs matching of cable-based measurements to the frames in the live feed transmitted from the external camera device.

The exercise machine then performs a workout determination for an exercise such as for a repetition being performed using the vision-based and cable-based measurement data. For example, a prediction of whether correct or incorrect form has been detected is generated using a model such as a machine learning model and/or rule-based model. In one embodiment, rules are stored in a backend on a database, and retrieved by the exercise machine when a form feedback determination is to be made.

In one embodiment, the cable-based measurements and vision-based information are used to detect form for different portions of the same exercise, where for example, the cable-based measurements and vision-based information are non-overlapping. For example, a user is performing a Romanian deadlift exercise, where one hand is going downwards while holding onto the cable, and the other leg goes up. In this case, the cable information applies to the hand, and the imaging-based information applies to the foot. In this case, the vision-based information may be used to determine whether the user's form with respect to their foot is correct/ at an appropriate height, and in turn provide feedback on whether they should lift their foot higher or lower their foot because it is too high. As shown in this example, the manner in which cable-based information and vision-based information are combined or used to determine form feedback is based on the movement being exercised by a user, where different movements may combine the imaging-based information and cable-based information in different ways.

Over the course of a workout, workout determinations such as form feedback may be determined for different portions of the workout. In one embodiment, at the end of a workout, aggregate information about the sets in which incorrect form was detected is sent to the external camera device. If the external camera device is one that has a screen such as a user's mobile phone, then video playback is performed to display video in which incorrect form was detected in the workout.

In one embodiment, a mobile device stores the recorded video frames captured during the workout. The form feedback information that is sent from the trainer back to the external camera device is tagged with frame identifier information indicating the set of frames in which incorrect form was detected, where the relevant frames are determined based on the key points used to determine the incorrect form and/or where the key points are derived from video frames identified by their corresponding frame identifiers. For example, if incorrect form has been detected where the exercise machine and/or backend entity make the form prediction, the trainer also transmits a message to the movable camera device that identifies the set in which incorrect form occurred. This is then synchronized with, for example, a mobile application on the mobile device, where video playback is stored, and where, in one embodiment, the video playback that corresponds to the incorrect form is stored or otherwise recognized, allowing that video segment corresponding to the incorrect form to be displayed in the mobile phone app.

In one embodiment, video replays of the user's exercise are annotated with form feedback information. For example, the external camera device/mobile phone app is configured to annotate the video replay with corresponding form feedback information, that may be synchronized to the video. In one embodiment, the video data is sent from the external camera device to the exercise machine for playback on the exercise machine, where the exercise machine is configured to annotate the video data so that replays viewed on the display of the exercise machine are annotated. As another example, video is sent to the backend, where the backend performs the annotation. A user may then view a replay that is annotated for form feedback on their movable camera device, exercise machine, or through a browser-based interface, for example when viewing through a browser on their desktop or laptop, by streaming or otherwise receiving the annotated replay from the backend.

Computation distribution using the architecture described herein provides flexibility, where different processing is capable of being performed at different locations—the external camera device, exercise machine, and/or cloud backend. As one example, the external camera sends the video feed to the trainer, where the trainer locally determines key points, synchronizes cable-based measurements with the vision-based information, and other procedures. For example, suppose that the external camera device is a third party RTSP capable camera that is connected to the trainer. The camera sends a raw video stream to the trainer, where the trainer is configured to perform a majority of the form detection processing, including pose estimation using computer vision and machine learning models, locally on the trainer.

In one embodiment, a hybridized model is also facilitated, where some processing is performed at the external camera device. For example, the generation of key points from video frames is offloaded to the external camera device instead of being performed on the trainer, with the key points being transmitted to the trainer for further downstream use. In this way, the external camera device's computing capabilities are leveraged to perform a portion of the form detection processing such as pose estimation and key point determination by processing, on the external camera device, the video stream in real time. For example, in a mobile phone implementation, libraries inside of the mobile app installed on the mobile phone are used to perform the pose estimation. This may provide an improvement of increasing network capacity since instead of transmitting raw video data with its larger network burden, the device may transmit simple three-dimensional coordinates for a set of canonical key points in pose data. As referred to herein, "pose data" is a reduced description of a human positioned in 3D space, for example a set of canonical key points such as 32 key points that describe the location of, for example a right elbow, a right shoulder, a left shoulder, and so on at a specific time:

Pose Data for Bench Press User XX
    time=10 ms: {<0.12, 0.21, 0.62>, <0.23, 0.24, 0.64>, <0.31, 0.8, 0.32>, . . . <0.12, 0.23, 0.23>}
    time=20 ms: {<0.12, 0.21, 0.62>, <0.23, 0.24, 0.64>, <0.41, 0.8, 0.62>, . . . <0.12, 0.23, 0.23>}
    time=30 ms: {<0.12, 0.21, 0.62>, <0.23, 0.24, 0.64>, <0.52, 0.8, 0.92>, . . . <0.12, 0.23, 0.23>} . . .

Without limitation, the number of canonical key points in pose data may be determined based at least in part on the application, and may be 21, 26, 30, and/or 32. In one embodiment, Mediapipe may be used to provide a framework to perform computer vision inference over video at least in part to output pose data.

The distribution or splitting of computation is adjustable. For example, over time, the distribution or splitting of computation may change. For example, in the case of the cameras of mobile phones being used with a trainer, one benefit of users bringing their own devices is that the computational power of mobile phones continues to increase over time. While currently, a mobile phone may have the computation power to handle generating and streaming key points, the computation power may evolve over time to be sufficient to perform even more processing on the mobile device, allowing further offloading of computation from the trainer and/or the backend.

In one embodiment, the splitting of processing is also based on the time scale of the processing to be performed. For example, if a determination is to be made within a repetition or at the end of a set, the computation is configured to be performed on the external camera device and/or exercise machine. If the results of processing need not be available until after a workout has ended in which the round trip time and time for processing is longer than a repetition, then such processing may be performed at the backend.

For example, there are various types of form feedback that may be generated, which pertain to different points of a workout. In one embodiment, where a computation is performed is determined based at least in part on when the form feedback is to be provided, such as during a rep, after a set, and/or after a workout as a summary.

In one embodiment, the trainer is configured to perform workout determinations using vision-based information received from the external camera device in combination with cable-based measurements. In some cases, such as bad network connections, the vision-based information may be incomplete for the purposes of performing processing such as form detection.

In one embodiment, for robustness, if insufficient vision-based information is received at the exercise machine, then the vision-based information is discarded, ignored, or otherwise not used in determining form feedback, or any other type of workout determination. For example, form feedback is determined at the trainer using only the cable-based measurements collected locally at the trainer.

Off-Trainer Movements. In one embodiment, the camera is used to capture information about the user when they are performing movements off of the machine such as pushups or sit-ups, where they are not using the cables, and there are no cable-based measurements to be collected. For example, the video stream captured by the external camera device is evaluated to count repetitions of off-trainer moves, such as by evaluating the change in position of collected key points.

Body Composition. In one embodiment, vision-based information captured by the external camera is used to determine body composition. This includes physically determining a difference in body composition, such as in the size of bicep and/or lost weight in a waistline. Such information may be used to provide validation and/or encouragement to a user.

In one embodiment, at least a portion of the processing for determining body composition is performed at the backend, as generating a three-dimensional (3D) model of a person is computationally intensive. To determine body composition, at least two images of a person from different angles are captured. For example, the user is directed to position themselves so that a picture from the front is taken, and then the user is prompted to turn around so that an image of the user from a second view is taken. The images are then sent to the cloud/backend, for example directly from the external camera device and/or via the trainer, where the cloud extracts a dense set of key points from the images, resulting in key point information about the user from two different angles. In one embodiment, the key point generation is performed on the external camera device, and the key point information is sent to the cloud.

A machine learning model is executed at the backend that fits the user into a 3D human model based on the key point information about the user from the two angles, information about the model, information about other humans that is accessed by the model, as well as information about the user themselves such as their height and weight. In one embodiment, a 3D body figure of the user is produced. Individual measurements are then captured based on the generated 3D figure, such as measurements of arms, waist and/or legs. Then, based on gender and other information about the user such as demographic information, approximate body composition information is calculated.

Injury Detection. In one embodiment, the vision-based information captured by the external camera device is used to detect whether the user is injured. In one embodiment, in response to detecting a potential injury, the trainer assists the user by offsetting the resistance or weight they are countering, or otherwise reducing the user's workout load based on the detection of injury.

Form Evaluation/Coaching. In one embodiment, form evaluation is supported via the use of an external movable camera device. For example, workouts and/or virtual coaches may be recorded from one angle, where users are then asked to place their cameras in specific locations such that when the virtual coach and the stream of the user are displayed together on the screen, the user's body is placed next to the coach's body for every movement. In this way, by showing the user next to the coach in the display as they are performing a movement, the user is able to directly see how their form compares to that of the coach's. This allows the user to see themselves in conjunction with the coach, in real time.

Generating a highlight reel of a workout reel. In one embodiment, the detected instances of incorrect form determined by the trainer are transmitted, along with the associated portions of the video stream in which the incorrect form was detected, to the backend. The backend entity is then configured to generate a highlight reel or summary of the person's workout by stitching together a compilation of video clips such as a set of video frames of the instances in which incorrect form was detected. The highlight reel may be escalated to have a user focus on the incorrect form.

Gesture and object detection. In one embodiment, vision-based information is used to detect events. In one embodiment, gestures are determined using key point information to provide a way for a user to communicate back to the trainer. For example, a quick rotation of the wrist with all fingers together may indicate the trainer to "cut" its weight immediately during a leg lift. In one embodiment, imaging-based information is evaluated using computer vision to determine obstacles in the surroundings of the user. The trainer is then controlled based on the determined obstacles. For example, if the camera device detects a person coming up behind the user in an unsafe way, the trainer automatically reduces resistance/weight in response.

Video Manipulation. In one embodiment, the external camera device is equipped with a sufficient amount of computational power and configured to perform video manipulation. As one example, in a form feedback context, a visual representation of the user is created from key points generated at the external camera device. The visual representation is included in the video stream, where highlighting of areas with incorrect feedback such as annotation as described above is added as an overlay on top of the video stream.

For example, suppose that incorrect form is determined. The video stream is manipulated to include a visual representation of the user in which the portion of their body with incorrect form is highlighted red. In one embodiment, the portion of the body representation to highlight is determined by identifying the subset of key points that correspond to where the incorrect form was detected. As the representation of the user is generated from key points, the region on the representation that corresponds to the subset of key points associated with the incorrect form is identified and highlighted in the video stream.

Other examples of manipulation of the video stream include increasing the gain on images, reducing contrast/brightness, removing objects, saturating a sensor, and/or performing further processing on the key point data such as beyond generating the key points at the external camera device.

False Positive Reduction. The use of cable-measurement based data in conjunction with vision-based information is beneficial for reducing false positives in some models. In one embodiment, the cable-based measurements are used to determine whether or not a user has started a rep (repetition). If a prediction based on vision-based information is generated, but it is determined based on the cable-based measurements that the user has not started a rep, then the prediction is determined to be a noisy prediction that is ignored or discarded.

Post Action Reporting. In one embodiment, the trainer is configured to perform real-time computations at the time scale of exercise reps. In one embodiment, the backend is used to perform processing that need not be performed as repetitions are occurring, and that can be ready by the end of a workout, such as generating highlights, generating a workout reel, and/or generating a post action report or summarization. As one example of post-workout analysis, the backend service evaluates data across sets and repetitions to determine aggregate metrics, such as the variability in leg position across three sets of performing a Romanian dead lift. If a video feed is available to the cloud service, the cloud service may also evaluate each rep across the entire workout. In one embodiment, the external camera device is configured to transmit video data directly to the cloud service if, for example, the user has opted into allowing the cloud service to collect their video data.

Figure 3:
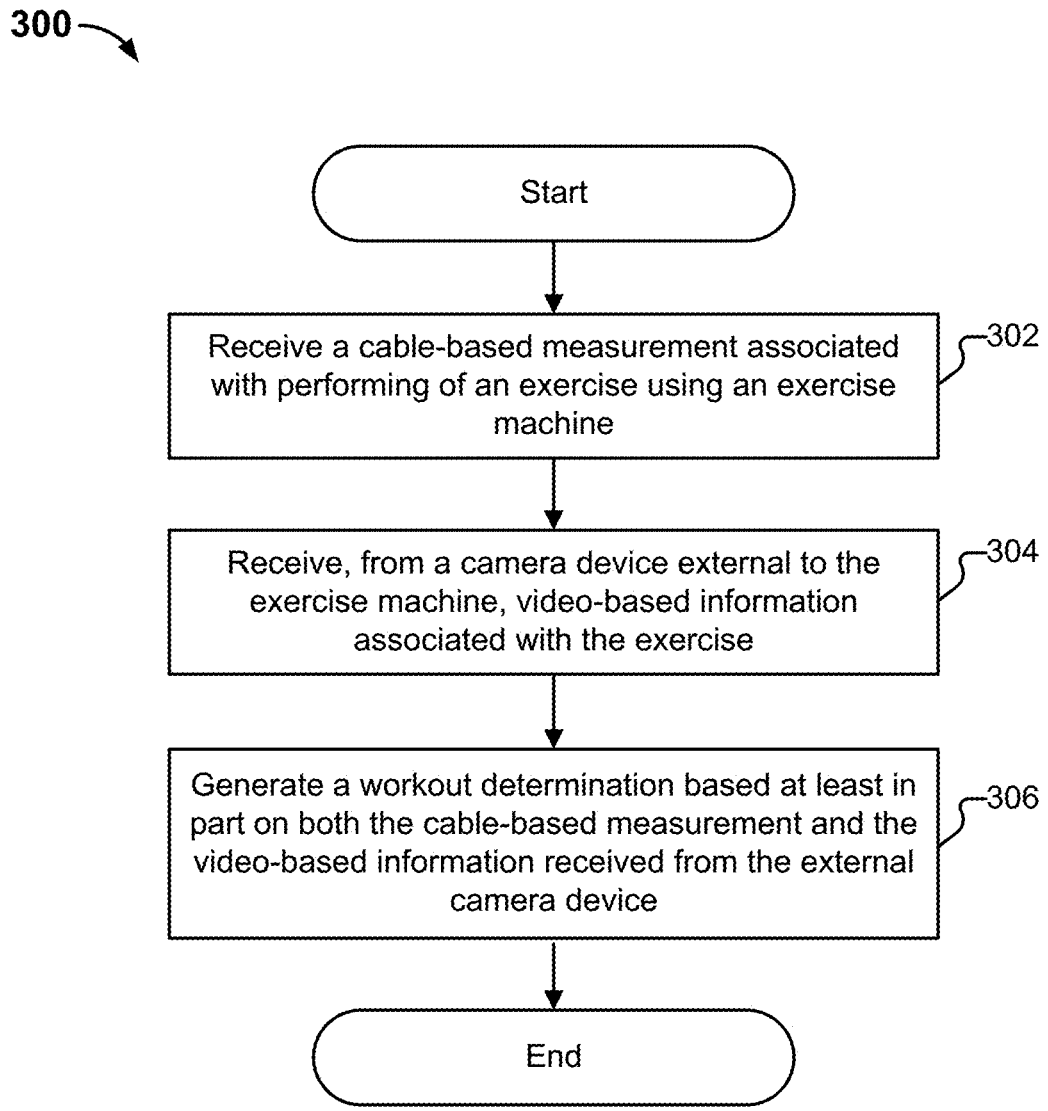
FIG. 3 is a flow diagram illustrating an embodiment of a process for generating a workout determination.

FIG. 3 is a flow diagram illustrating an embodiment of a process for generating a workout determination. In one embodiment, process (300) is carried out by exercise machine (102) and/or movable device (104) and/or cloud backend (108) of FIG. 1A. The process begins at (302), when a cable-based measurement associated with performing of an exercise using an exercise machine is received. At (304), video-based information associated with the exercise is received from a movable camera device external to the exercise machine. At (306), a workout determination is generated based at least in part on both the cable-based measurement and the video-based information received from the external camera device.

Robust Camera-Based Form Feedback Using Data Augmentation. In one embodiment, data augmentation is used for more robust camera-based form feedback. In one embodiment, user guidance provided using a separate movable camera such as (104) in FIG. 1A may be improved as users may place the camera at different distances, tilt angles, heights.

Data Augmentation. There are at least two different models and/or machine learning to process form feedback. The first model enables a conversion from raw video data from a camera to pose data, which improves efficient use of computational resources by its reduced data format. As referred to herein, "computation resources" include the on-site, off-site, and cloud processing requirement, processing speed, processing power consumption, processing thermal load, memory requirement, memory capacity, storage requirement, storage capacity, network requirement, network speed, network latency, and/or network sustained bandwidth. The second model enables a pose data classification, for example as positive/good form, or for example as negative/poor form. Pose data augmentation includes increasing the robustness of either the first model or the second model to improve processing form feedback.

In one embodiment, global data changes and local data changes enable training video conversion and/or pose data classification to augment form feedback by making global and/or local changes to data related to recorded video.

Global Data Change. An example of a global data change is motion retargeting which can be used to adjust white balance, brightness, glare, field of view, height across the entire video without changing the actual movement of the coach/performance expert, and improve robustness to different viewpoints, positions, and/or tempo. As referred to herein, "motion retargeting" includes mapping motion between different kinematic structures, such as capturing motion from one person's exercise rep and retargeting the motion onto a different exercise rep. Motion retargeting may include:

- collecting an initial reference set of video data of users, coaches, performance experts, and/or professional athletes performing a workout with correct/incorrect form using a mobile camera or accessory camera;
- using motion retargeting to generate additional synthetic positive samples using tempo, distance, tilt, and height transformations within the prescribed field of view boundary conditions to the user;
- using motion retargeting to generate negative samples outside of the prescribed/ideal joint angles; and/or
- using contrastive learning techniques to allow the model to learn positive and negative examples and train models.

In one embodiment, data augmentation techniques using motion retargeting are used to add angle robustness to provide flexibility where the external camera device may be placed relative to the exercise machine. For example, motion is re-sampled at various angles for a given datapoint and added to a training dataset.

The model training techniques described herein may without limitation be adapted to accommodate other types of applications, such as repetition counting, assessments, ROM, flexibility, struggle detection, fatigue detection, and/or safety/injury events.

Synthesizing New Data. In one embodiment, a video and/or motion is captured of a coach/athlete doing a move correctly which may be motion retargeted to other videos/kinematic structures to make a new example of a correct/positive movement/rep. Conversely, a video and/or motion may be captured of a user doing a move incorrectly with may be motion retargeted to other videos/kinematic structures to make a new example of an incorrect/negative movement/rep. Thus, motion retargeting is used to generate new synthetic data without having to video and/or motion capture each example. In one embodiment, the synthesized new data is used as training data to teach models such as machine learning models right/positive from wrong/negative.

For example, one correct example of a squat by a coach/athlete may be used to create a plurality of correct squat training examples by using motion retargeting to synthesize data for a given user's model so that the model is able to learn without having to actually video record a number of correct examples for training.

For example:

A user may have a remote camera at a specific angle of 45.3 degrees to the side, where there may be little training models at that specific angle. Motion retargeting may be used to synthesize a positive squat example at that specific angle;

A user may be taller than is typical, where there may be little training models for that tall of a user. Motion retargeting may be used to synthesize a positive squat example for a taller user;

A user may have a remote camera with a color palette issue that undersaturates colors in images from the camera, where there may be little training models with the modified color palette. Motion retargeting may be used to synthesize a positive squat example with that color palette;

A user may have a remote camera at a far distance, where there may be little training models at that different distance. Motion retargeting may be used to synthesize a positive squat example at a further distance;

A user may have a higher tempo, where there may be little training models at that repetition tempo. Motion retargeting may be used to synthesize a positive squat example at the higher tempo;

A user may have a remote camera at a tilt, where there may be little training models at that different tilt. Motion retargeting may be used to synthesize a positive squat example at the tilt angle;

A user may have a remote camera with too much deep overhead lighting causing glare in the camera, where there may be little training models with that level of glare. Motion retargeting may be used to synthesize a positive squat example with that level of glare; and/or A user may have a cat running around in the background, where there are now training models with a cat. Motion retargeting may be used to synthesize a positive squat example with the cat in the background.

For example, a specific incorrect bodily movement may be applied to one or multiple movements, such as for most movements a user's knees should not go over their toes. Under a controlled studio, captured video examples by a coach/performance expert may give an example of this negative/incorrect pose. Motion retargeting may then apply those kinematics to other models/videos to train either incorrect form and then teach the model a user's knees should not go over a user's toes; these can be applied to the movements to train a model to determine a "knees over toes" flag for movements where that is an important form feedback trigger.

In one embodiment, a process to capture video from a coach/performance expert(s) is to record a few videos while notating what specific joints and specific angles are important for a given movement based on expert advice. A group of internal users are commissioned to repeat the given movement and are recorded with captured video to expand the movement dataset. Each of the internal user videos are then analyzed by a coach/performance expert(s) to evaluate aspects of good or bad form during the given movement. The movement dataset may then be used for motion retargeting. Periodically, aggregated and/or individual video may be captured from regular users to further be analyzed by a coach/performance expert(s) to further enhance and/or add more to the movement database. This may happen, for example, based on statisticals and/or values of a form for the movement that was not earlier seen with the group of internal users.

In one embodiment, skeleton aware motion replacement is used for motion retargeting. Skeleton aware motion replacement may pass pose data directly and/or may leverage understanding of kinematics in the body. In one embodiment, non-skeleton aware motion replacement is used for motion retargeting.

Key Points and Model Training. FIG. 4 is an illustration of the pose domain. In one embodiment, the external camera device (104) and/or computation engine (120) in FIG. 1A extracts key points and/or poses shown in FIG. 4. As shown in FIG. 4, the raw 2D video/image captured by movable camera device (104), here shown to be a user engaging the exercise machine in a squat exercise from standing (402) and squatting (404). As described herein, key point extraction may be used to provide a canonical set of key points, for example 32 key points. Pose extraction may include calculation of angles and motions between the canonical set of key points. As shown in FIG. 4, this pose data is depicted as a "stick man" of the canonical key points in 3D space, both standing (422) and squatting (424).

One improvement of transferring a raw 2D video/raster/image to a vector of 3D points is the reduction of memory required to store and transfer the reduced canonical key points (422), (424). Another improvement is the reduction of computation required to analyze the reduced canonical key points (422), (424) over traditional analysis techniques for images/video (402), (404).

During training, coaching videos may be motion retargeted for various remote camera angles, distances, and heights, which may be used for a given user workout to train a pose model on positive and negative poses or motions. Then when the user is working out the user's video (402), (404) is reduced to the key points (422), (424), all motions and angles are recalculated at each frame, and the model has learned to say, "If these key points are arranged in one of these arrangements, a form feedback is generated."

Thus, a user who in real life has now put their knees over their toes, upon extraction of that video data, and feeding pose data through the model, which has been trained on knees over toes, the model may output, "good . . . good . . . bad . . . bad." And if there are several "bad" flags in a row, the user receives a form feedback message, "You are doing bad; your knees should not be over your toes."

As described above, the whole effort of coaching in 3D space may be thought of as an open-ended problem, as nearly every user would deviate in at least a minor way from a "perfect" movement such as a squat from an Olympic athlete. Thus, a model such as a machine learning model may be used to prioritize highly negative poses and/or motions and flag when a user may be engaging in inefficient and/or safe behavior. Conversely, the model may be used to prioritize highly positive poses relative to historical user behavior to flag when a user may be encouraged by significant progress in learning a movement.

In one embodiment, a simpler rule may be used such as, "if the exposition of the knee is greater than the exposition of the toe, then produce a warning." In one embodiment, a model such as a machine learning model is used to provide greater camera/angle robustness. That is, the movable camera may not be in a perfect position. With challenges like different angles, occlusions, and lighting conditions, the simpler rule may start to malfunction without a model. As well, there may be rules that are more complex than "knees over toes", where it is not as simple as comparing two positions, as it may take multiple different degrees and angles all moving together. A rule may be challenging to necessarily list each of them, wherein a model may potentially do a more efficient way to express such complex pose/motion than a set of rules/expressions.

Forward Kinematics and Inverse Kinematics. In one embodiment, forward kinematics are used to enhance/improve pose estimation and/or modeling. As referred to herein, "forward kinematics" uses anatomical knowledge of the human body along with one or more joint locations to determine/verify a position of a specific part of the model. For example, a location of a fingertip may be computed from positions and/or angles between a shoulder, elbow, wrist, finger, and knuckle joint, which may be subsequently confirmed as a form of checksum to ensure that the pose estimation and/or modeling is reasonable if the computed location of the fingertip is similar to that observed.

In one embodiment, inverse kinematics are used to enhance/improve pose estimation and/or modeling. As referred to herein, "inverse kinematics" uses anatomical knowledge of the human body along with a position of a specific part of the model to determine/verify one or more joint locations. For example, given a location of a fingertip, the positions and/or angles between a shoulder, elbow, wrist, finger, and knuckle joint may be confirmed as a form of checksum to ensure that the pose estimation and/or modeling is reasonable; for example that a finger does not extend more than 90 degrees from the wrist, for example.

Inverse Kinematic Adjustment. Inverse kinematic adjustment may use inverse kinematic consideration to provide extra control on single joints and/or lower number of joints. Inverse kinematic adjustment enables further improvements for video and pose generation. Whereas motion retargeting enables advanced/robust pose data as described above based on coach/performance expert video, inverse kinematic adjustment enables creating new pose data with less computational resources expended and less resources from coach/performance expert(s) to record video, by manipulating joints and/or angles. In one embodiment, inverse kinematic adjustment is used based at least in part on an inverse kinematic engine such as OpenSim.

For example, if a coach/performance expert records a bench press movement with an angle of 90 degrees at elbow, inverse kinematic adjustment enables new pose data with a 70 degrees elbow angle and/or new pose data with a 100 degrees elbow angle. That is, with multiple ways of doing bench press a user is performing a wide grip bench press, with a certain recommended elbow angle and a further recommendation to make sure arms are parallel, for example, wide and large and parallel to the user body. To make sure that the elbow angle is 90 degrees at the lower part of the motion, a trainer may be enabled to provide a form feedback if the elbow angle is 70 degrees and/or the user went too low; this requires that pose data points for the user/camera/trainer need be collected for 90 degree data points as well as 70 degree data points, 110 degree data points, and so on. These small deviations to the movement may be controlled with diverse schematic using inverse kinematic adjustment. A coach/performance expert may label the new 70 degree and/or 110 degree pose data as negative to indicate negative form feedback if a user were to reach those elbow angles.

Local Data Changes. An example of a local data change is inverse kinematic adjustment which can be used to change joint angles such as the bench press elbow angle described above. Local data change may adjust any ideal/prescribed joint angle, relative positioning of key points, and/or any derivative used for determining a positive/negative form feedback, including prescribed joint angles, such as:

- artificial joints, which as referred to herein are three or more points in a body that do not actually share a joint. A synthetic joint is created from the points and math is analyzed around angles from the synthetic joint;
- linear motion, for example "knees over toes" is not necessarily a jointing but a straight spatial comparison rather than an angle; and/or
- center checks, for example taking hip key points, calculating the center and comparing that nose key points and establishing a synthetic axis to understand if the user is doing any postural sway.

Contrastive Learning Techniques. In one embodiment, self-supervised learning such as contrastive learning is used. For example, a positive sample may be established and a negative sample may be established for the self-supervised learning to commence, and augmentation of either sample is added with transformations in for example color, lighting, and/or background distraction. In one embodiment, the contrastive learning loss function minimizes distance between positive samples and their augmented samples while maximizing distance between negative samples and their augmented samples.

Motion smoothing/filtering. In one embodiment, for certain movements there is a different time element. For example, for the "knees over toes" danger flag, there is less of a time element because if at any moment a user's knees go over their toes, it is dangerous to the user. A smoothing and/or filtering, such as a rolling average of pose data/frames, is used to reduce the effects of video jitter and/or an aberrant single model frame of "knees over toes" such as may happen if the model has made an error. In this case, the user does not necessarily deserve bad feedback, but jitter and/or errors have made it seem like knees are over toes for a single frame. Thus, models may have a threshold number of frames, take averages over a threshold time period, and/or assess a variation over a slice, to commit to an action.

Figure 5:
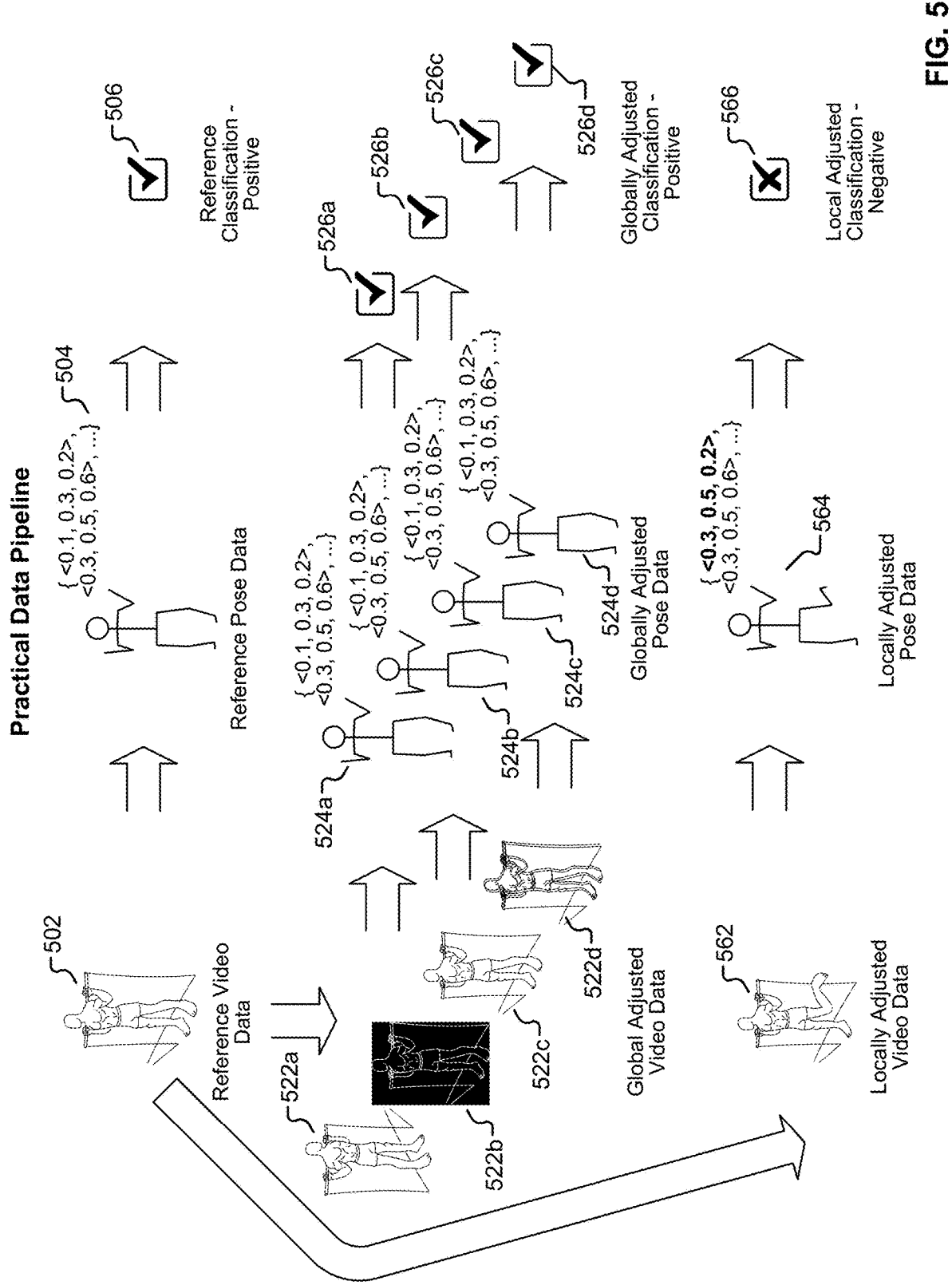
FIG. 5 is an illustration of augmentation for a data pipeline.

Example Data Pipeline. FIG. 5 is an illustration of augmentation for a data pipeline. In one embodiment, the trainer (102), external camera device (104) and/or cloud (108) in FIG. 1A carry out the data augmentation in FIG. 5. Reference video data (502) is recorded for a specific movement, wherein the reference video data (502) may be a video of a coach, performance expert, athlete, and/or training professional. In one embodiment, reference video data (502) may also be recorded from one or more internal users with a coach to evaluate form. In one embodiment, reference video data (502) may be recorded with appropriate privacy protection from one or more regular users with a coach to evaluate form.

In one embodiment, computer vision and/or machine learning is used to take the reference video data (502) and convert it to reference pose data (504), for example to a vector of 32 three-dimensional key points covering each key body part position for each frame in time. A reference classification (506) is made for the reference pose data (504) which may be positive, indicating good form, or negative, indicating poor/bad form.

The conversion of field video data to pose data is made more robust with more training. Global adjusted video data (522a, 522b, 522c, 522d) is a synthetic way to provide more training for this conversion model/process, with the improvement of lower computational resources and development time in comparison to taking more coach reference video. In one embodiment, motion retargeting is used as a global adjustment to provide video with different angles (522a), lighting (522b), bias (522c) and/or focus (522d) to account for different devices and placement for the external camera (104) in FIG. 1A. In one embodiment, computer vision and/or machine learning is used to take the global adjusted video data (522a, 522b, 522c, 522d) and convert it to reference pose data (524a, 524b, 524c, 524d). A reference classification (526a, 526b, 526c, 526d) is made for the reference pose data (524a, 524b, 524c, 524d).

The classification of pose data to form feedback is made more robust with more training. Local adjusted video data (562) is a synthetic way to provide more training for this classification model/process, with the improvement of lower computational resources and development time in comparison to taking more coach reference video. In one embodiment, inverse kinematic adjustment is used as a local adjustment (562) to provide video with a different movement, in FIG. 5 shown to be a user lifting their left leg during a movement. In one embodiment, computer vision and/or machine learning is used to take the local adjusted video data (562) and convert it to reference pose data (564). A reference classification (566) is made for the reference pose data (564), in the case of FIG. 5 negative as a user should not be lifting their left leg in that manner.

Summary of Augmentation. In summary, motivation for augmentation is to reduce two sources of error in automated form feedback. A first source of error is in the conversion of video into pose data. A second source of error is in using pose data to classify form accurately to provide form feedback.

Therefore, augmentation addresses two different levels. A first augmentation level, such as using global data change and/or motion retargeting, more accurately transforms video data to pose data by creating many different (global) video transformations, thus creating different pose data for training models for conversion of video into pose data. A second augmentation level, such as using local data change and/or inverse kinematic adjustment, more accurately builds a classifier that is robust to transformations by creating many different (local) pose data transformations, thus creating different pose data for training models for classification of pose data.

Multi-Modal Form Feedback. In one embodiment, training a multi-modal form feedback model that uses the context from camera and position-based modalities provides an improvement of more accurate guidance to users. In one embodiment, a sensor fusion is used to combine heterogeneous signals, such as those camera-based and position-based, with different structures, different latencies, and/or different frequencies. For example, pose data is a time series that may have a frequency of between 10 to 30 Hz, IMU data is a time series that may have a frequency of 52 Hz, and cable position data is a time series that may have a frequency of between 50 to 100 Hz. For example, pose data may have a couple of milliseconds delay for processing, IMU data over Bluetooth/WiFi/4G/5G may have a delay, and cable position data may be real-time. A common language/framework also is established to accommodate different data structures in each sensor in the sensor fusion.

In one embodiment, a first phase is to receive different data from different sensors, such as a camera and a cable measurement. A second phase is to synchronize the different sensor data, in part to build a variable and/or score from combining the sensor data. For example, a timestamp is established on each source, and events are considered related if they happen within a repetition. In one embodiment, the variable is an algebraic expression and/or algebraic variable. In one embodiment, confidence parameters are set and analyzed for sensor data, for example establishing that a shoulder to hip distance of 5.32 is made with 85% confidence. In one embodiment, a frame's sensor data where confidence parameters are below a threshold is discarded. A third phase is establish a trigger flow on the variable/score to establish confidence on when to provide guidance such as form feedback. The output of the algebraic expression may be Boolean such as "good form or poor form", or it may be a scale from zero to 100 to infer quality of movement. The guidance may without limitation include a form feedback, mobility assessment, stability assessment, and/or balance assessment. For example, if a user does a squat with their hands, the form feedback may include that the user's shoulder is only moving 65% correctly.

Without limitation, the multi-modal form feedback includes context from at least a plurality of the following: a front-on camera, a side camera, an overhead camera, a cable sensor, an accelerometer sensor, a velocity sensor, a position sensor, a load sensor, a torque sensor, a tension sensor, a gyroscopic sensor, a wrist rotation sensor, a wrist-based sensor, an actuator-based sensor, a handle-based sensor, an IMU, a depth-based sensor, a lidar sensor, radar sensor, a sonar sensor, an infrared positioning/reckoning sensor, an imaging stereo depth positioning/reckoning sensor, a near-field positioning/reckoning sensor, an IMU positioning/reckoning sensor, a satellite positioning/reckoning sensor, and a lightsaber sensor.

Using contextual information from two different sources has the technical improvement of reducing false positives and allows detecting of situations where form feedback may be provided. This is enabled in part through the additional use of position-based measurements, without limitation such as cable-based measurements, which allow for the detection of specific situations. In one embodiment, training a multi-modal form feedback model includes:
- building a set of key variables referred to as trigger variables to assess users ROM, velocity, angular displacement, phase, inconsistent ROM, distance traveled, various body joint angles, relative position from ground, and so on. As referred to herein, a "trigger variable" is a variable associated with an observable data: For example cable position, range of motion, and shoulder angle are all examples of a trigger variable;
- computing the trigger variables using cable and camera information to capture multiple contexts;
- combining the trigger variables in an algebraic format to map to real world exercise semantic events; and/or
- using the triggered semantic events to notify users of correct versus incorrect form.

Multi-modal combination of camera-based and position-based data is disclosed. In one embodiment, a rule-based algebraic combination is used to fuse together the video/vision-based and position-based measurements, in part to provide form feedback. For example, the combination of cable data, IMU data, front view camera data, and/or side view camera data are used to provide form feedback signals and/or cues. In one embodiment, an algebraic concept is used to reduce form feedback into specific subcomponents. For example, if detecting for the negative form of "knees over toes", multiple models may be applied by having them reduced to simple constructs such as knees-over-toes. Then we can say, okay, for move A, combine the knees over toes rule with your shoulder hip angle, maybe with some score given by a camera in an algebraic equation. And thus we can combine those things to form sort of a rule for a specific movement or for a specific flaw with the movement.

In one embodiment, the trainer includes movement specific machine learning models that are triggered with cable and camera data, and that take as input the key points from the external camera device, as well as related cable-based measurements. For example, the video information and the cable-based measurements pertaining to performing of an exercise movement may be used as input. As one example, the output of the machine learning model is a set of trigger variables for a specific type of form feedback such as that related to a specific movement, like a squat. The output trigger variable values may be combined with the related cable-based measurements, as well as additional information such as whether a workout is occurring, to determine a form prediction of whether correct or incorrect form has been detected.

In one embodiment, the key points optionally in conjunction with cable-based measurements are used to determine a set of trigger variable values. In one embodiment, the trigger variable values are sent to a cloud entity for further processing. In one embodiment, the cloud entity is configured with a database that includes rules usable to determine whether, given a set of trigger variables, whether there is correct or incorrect form.

In one embodiment, if it is determined, based at least in part on the trigger variables, that incorrect form has been detected, a notification is sent from the cloud to the trainer. The trainer may also transmit a message to the movable camera device that identifies the set in which incorrect form occurred. This is then synchronized with, for example, a mobile application on the mobile device, where video playback is stored, and where, in one embodiment, the video playback that corresponds to the incorrect form is stored or otherwise recognized, allowing that video segment corresponding to the incorrect form to be displayed in the mobile phone app.

In one embodiment, vision-based and cable-based data is combined after they have been synchronized. In one embodiment, cable-based data is taken into trigger variables, which are generated from the key point data. In one embodiment, the trigger variables are variable names that include semantic information describing what is occurring. The trigger variables and cable-based information are then combined in an algebraic expression such as a rule-based model to generate a workout determination such as form feedback. Multimodal information may thus be combined into a single expression or a plurality of expressions.

Consider an example in which a squat is performed. Suppose the external camera device is placed to the side of the user. The external camera device generates key points for side angle joints such as feet, knees, and hips. The generated key points are sent to the trainer. For example, suppose that key point information for the knee and the hip is received. As one example, a key point includes 3D coordinate information (such as X-axis, Y-axis, and Z-axis coordinates) of where the person's hip and knee are at a particular point in time, which in one embodiment is identified by a corresponding frame identifier.

The trainer uses the key point information as input to a form detection machine learning model. The machine learning model is configured to use the key point information to take the hip/knee angle through time as an input. As one example, this information is structured in data frames, and the machine learning model is configured to determine whether correct or incorrect form has been detected based, for example, on a threshold calculated of hip/knee angles. Various types of models may be used without limitation, such as rule-based models, logistic regression models, and other machine learning models. In the example of using a logistic regression machine learning model, taking the hip/knee angles over time, determined from the key point information, a binary classification is provided as output, where the classification is whether correct or incorrect form has been detected based on the input. In one embodiment, this binary classification is converted into a trigger variable value.

The trainer is configured to combine this trigger variable, which is determined based on vision-based information, with cable-based information. In one embodiment, feedback is to be provided after a second repetition; a second trigger variable is computed that counts the number of reps since start. The vision-based and cable-based trigger variable values are then combined into an algebraic equation that includes hip/knee angle output of the logistic regression threshold based on hip/knee angle, versus repetition count. If both are above a certain threshold, then a prediction of correct or incorrect form is triggered. Other examples of cable-based measurements that may be used as input to make a prediction, or to improve the confidence in predictions, include ROM data.

Figure 6:
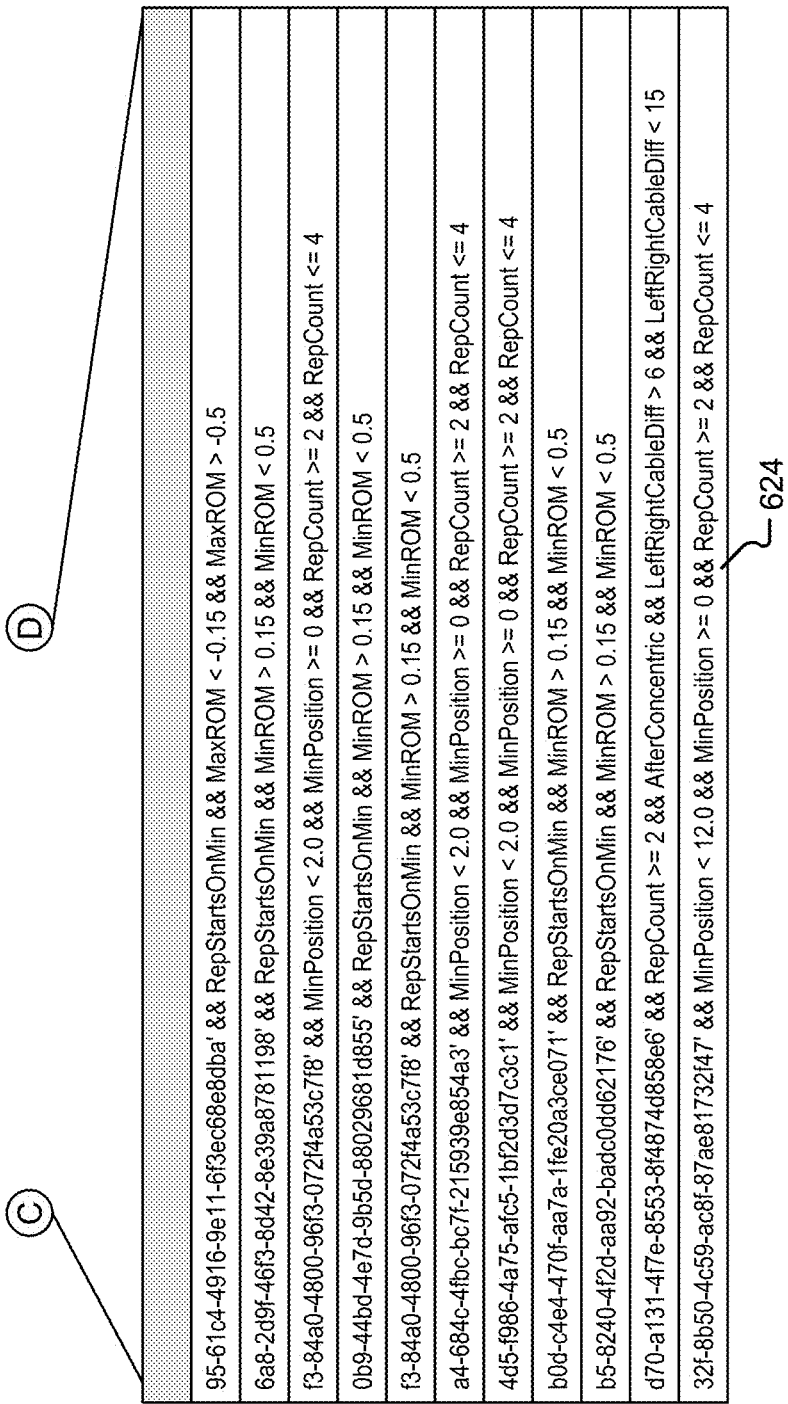
FIGS. 6A and 6B are illustrations of multi-modal algebraic expression and trigger variables.

FIGS. 6A and 6B are illustrations of multi-modal algebraic expression and trigger variables. In one embodiment, the trainer (102), external camera device (104) and/or cloud (108) in FIG. 1A assemble and/or evaluation the expressions of FIGS. 6A and 6B, which are set up a priori by at least one coach, training professional, systems expert, and/or performance expert.

In one embodiment, as shown in FIG. 6A, expressions are represented by rows in a table, for example a database table, each with an ID, and optionally a publishing flag and/or tracking system with creation date, modified date, and/or deletion date. The expression may have a description/form feedback (602), shown in greater detail with a zoom-in (622), which may describe the expression in terms of its form feedback, pose, and/or movement, for example "Bring both arms fully back parallel with your chest. (Reverse Fly)". The algebraic expression (604), shown in greater detail with a zoom-in (624), may be expressed as a function of a movement identifier, contextual variables such as: whether the movement is one-sided meaning that it engages only a left limb or right limb rather than both limbs; what the current repetition count is; what the current cable position is and/or minimum position is; a confidence parameter for a key point and/or sensor data; and/or what the current pose is including any joint angles and/or joint positions. For example, an expression may be "movementID==(Reverse Fly) && RepCount>=2 && AfterConcentric && LeftRight-CableDiff>6 && LeftRightCableDiff<15". The expression may have a priority (606) relative to other expressions and/or a trigger type and/or result type such as text, audio, and/or visual.

In one embodiment, as shown in FIG. 6B, expressions are represented by rows in a table, for example a worksheet, each with one or more associated movements (652) such as "Pushup to Plank", a description/form feedback (654) such as "Keep hips up and body straight", and the algebraic expression (656) such as "5.22*MeanShoulderAnkleToHip-SignedDistance−0.00976*MeanShoulderHipKneeAngle+ 5.1*MeansShoulderAnkleToHipSignedDeviation+ 3.84*MeanShoulderKneeToHipSignedDeviation>−1) && PlanksHipsFormConfidence>0.4 && abs(90−abs(Spatial-PoseAngleX−90))<30 && abs(abs(SpatialPoseAngleRot)− 90)<30".

Other examples of trigger variables include rolling windows of stability, rolling windows of heights, specific joint/key point positions, minimum joint/key point positions, maximum joint/key point position, ranges of motion for a joint/key point positions, specific joint/key point velocities, minimum joint/key point velocities, maximum joint/key point velocities, smoothness of the various velocities, and asymmetry between left and right side movements in two-sided and/or one-sided movements.

Figure 7:
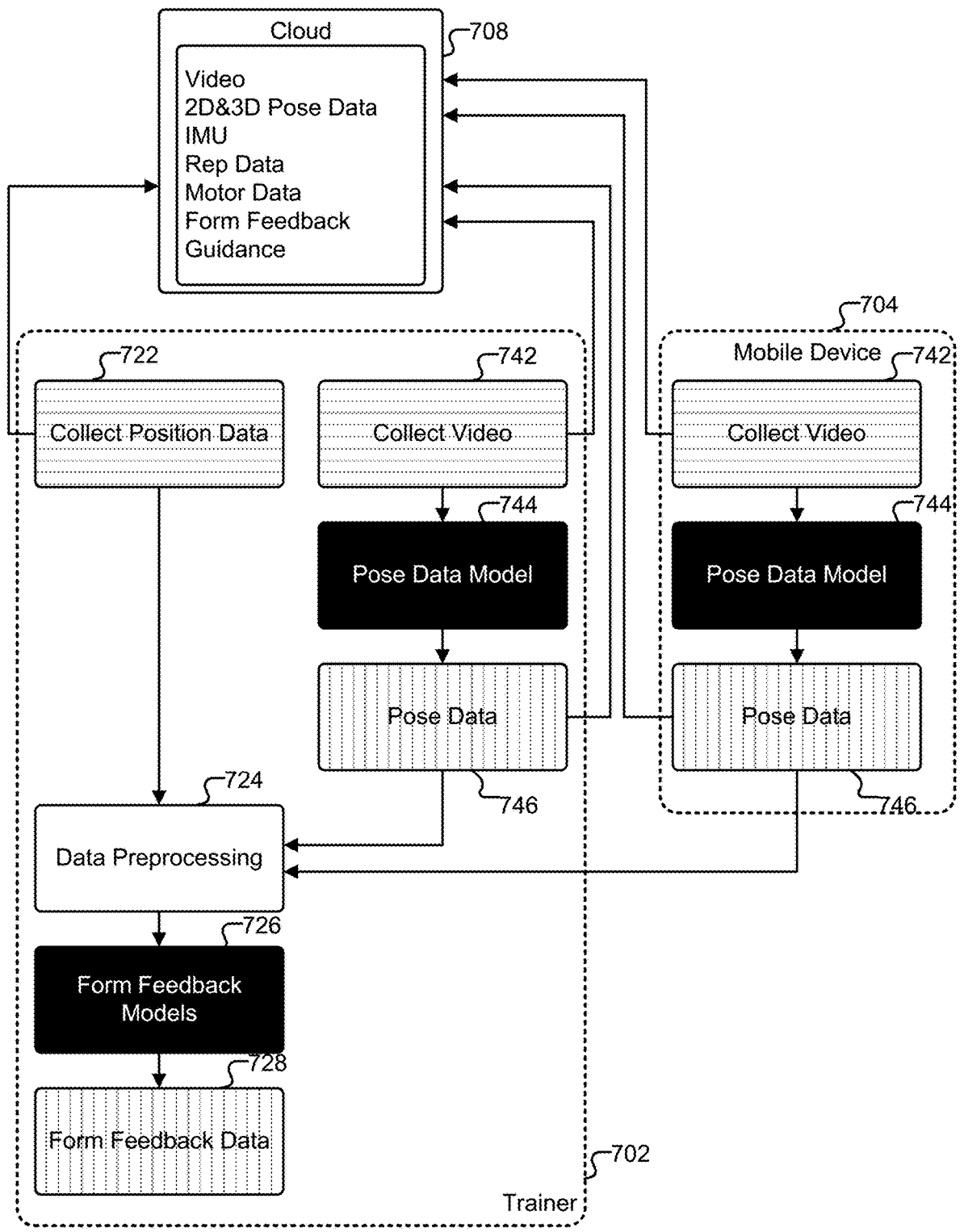
FIG. 7 is a block diagram illustrating an embodiment of an architecture for synthesis of exercise guidance training data.

FIG. 7 is a block diagram illustrating an embodiment of an architecture for synthesis of exercise guidance training data. In one embodiment, the system of FIG. 7 is that of FIG. 1A, wherein trainer (102), mobile device (104), and cloud services (108) of FIG. 1A are shown as trainer (702), mobile device (704), and cloud services (708), respectively, in FIG. 7. In FIG. 7, architectural elements that comprise sensors and/or cameras are shown with a horizontal hatching pattern, models such as machine learning models are shown with white text on black background, and output from models are shown with a vertical hatching pattern.

As shown in FIG. 7, cloud services (708) includes cloud storage of data including video data/parameters, 2D and 3D pose data/parameters, IMU data/parameters, repetition/workout data/parameters, motor data/parameters, and/or form feedback expressions/data.

In one embodiment, mobile device (704) includes several services such as the collecting of video (742), for example using a built-in camera and/or remote camera. This video may be processed further in mobile device (704), trainer (702), and/or transmitted to cloud services (708). The collected video may be ingested by a pose data model (744), to convert the video to pose data, as shown in FIG. 4. In one embodiment, synchronization, smoothing, rep detection, and/or interpolation is used when the pose data model (744) lags, for example 30 frames per second video data lags to 18 frames per second pose data. In one embodiment, a timer mechanism is used to discard pose data and/or resultant guidance if it is not triggered within an expiry time window, as there is little good guidance to give if too much time has passed after an incident has occurred. In one embodiment, pose data is made more efficient by a focus on relevant key points for the current movement. The resultant pose data (746) is sent to cloud services (708) and/or trainer (702) for multi-modal guidance.

In one embodiment, trainer (702) includes several services such as the collecting of position data such as motor and/or cable data (722). Also shown in FIG. 7 is an optional camera that may also collect video (742), convert video to pose data via a model (744), resulting with pose data (746) also sent to cloud services (708) and/or data preprocessing (724). This position data may be processed further and/or transmitted to cloud services (708). The collected position data is preprocessed (724) with the pose data (746) from mobile device (704), for example using the disclosed sensor fusion. Data preprocessing (724) includes determining joint locations using trigonometry and/or other mathematics based at least in part on machine learning to determine either which points are key points and/or how to determine key points based on trigonometric angles. That is, machine learning and/or models are used to determine what angles may be relevant as well as what the threshold values of those angles are in order to divide good form from poor form.

The preprocessed/combined data (724) may be ingested by a guidance/form feedback model (726), to classify the pose with respects to guidance/form feedback. In one embodiment, the model (726) is expressed as a machine learning framework such as a TensorFlow Lite model. In one embodiment, classification is made more efficient by a focus on relevant pose data for the current movement. In one embodiment, cloud services (708) is used as a processor and/or co-processor for models, in order to enable higher accuracy scoring. The resultant guidance/form feedback (728) is sent to the user and/or cloud services (708), in the form of at least one of the following: a score, a classification, a Boolean (good/poor), or a number, for example an assessment where a user is getting 65 out of 100. Thus, database preprocessing (724) may be thought of as creating trigger variables, for the guidance/form feedback models (726) to consume in order to provide guidance/form feedback (728).

Examples of algebraic/multi-modal combinations of trigger variables for form feedback. Two examples of algebraic combinations of trigger variables derived from different sensors, for form feedback, include:
1. Inline Chest Press Hip Torso Flexion, a form feedback which combines camera data and cable data. Its algebraic construction is:

$$\text{InlineChestPressHipTorsoFlexionProbability} > 0.565 \ \&\& \ \text{RepCountSinceSetResumed} > 1$$

wherein:
  a. InlineChestPressHipTorsoFlexionProbability is a camera based trigger variable calculated as follows: sigmoid ((−0.10053845*support_shoulder_hip_floor_ angle_2d_mean)+(−0.01866572*support_shoulder_knee_hip_angle_ 2d_mean)+ 8.48501459))
  b. RepCountSinceSetResumed is a cable based trigger variable which uses the current position of the cable versus its history to count how many reps a user has performed.
2. Bench Press Wrist Rotation, a form feedback which combines IMU data and cable data. Its algebraic construction is:

$$( (\text{MaxRepAngularDisplacementXZ1} >= 0 \ \&\& \ \text{MaxRepAngularDisplacementXZ1} <= 20) \ || \ (\text{MaxRepAngularDisplacementXZ2} >= 0 \ \&\& \ \text{MaxRepAngularDisplacementXZ2} <= 20) ) \ \&\& \ \text{RepCountSinceSetResumed} >= 2$$

wherein:
  a. the MaxRepAngularDisplacementXZ1 MaxRepAngularDisplacementXZ2 variables are IMU data
  b. RepCountSinceSetResumed is a cable based trigger variable which uses the current position of the cable versus its history to count how many reps a user has performed.

Guidance without explaining why. Note that expressing form feedback and/or other guidance based at least in part on classification enables the exercise system of FIG. 7 to guide the user even if a professional athlete/performance expert/coach does not explicitly teach the exercise system how to perform an exercise movement and/or what makes up good/poor form. That is, by classifying several observed "knees over toes" videos/pose data as "poor form", the professional athlete/performance expert/coach does not have to explain that knees should not be over toes in a movement, but the exercise system will indicate to the user through guidance/form feedback that it is a negative aspect of their form.

Thus there may be incidental angles that a coach may not think of as poor form until it is pointed out to them through the classification process, for example a hip shoulder ankle angle that changes at the same time as glutes are moving backwards; the system can answer a question the coach may never has posed: How far does the hip should ankle angle and glutes angle have to be in conjunction with one another for a position to be considered poor? A coach may not have considered or would not have calculated what threshold values are for such an angle, or even that the angle is significant, but with labeled data and training models based on classified video/pose data, the decision boundary to use the angle and what its threshold values are may be discovered. The machine learning and form feedback models (726) also provide a further improvement of automatically providing a translation of ideas such as "never knees over toes" or "hip shoulder ankle angle in conjunction of 64 degrees threshold with glutes" into a numerical and/or quantitative description.

Synchronization and Time Scales. There are different time scales at which the above calculations may occur. In one embodiment, the trainer (702) and/or system finds the ends of repetitions, with a subsystem finding when a repetition is considered complete. For example, for one type of form feedback, data is pooled until the end of the rep and/or near the end of the rep. The data over the rep is calculated as a batch to answer what the minimum actuator/cable position was during the rep, in order to provide form feedback and/or ROM analysis. Thus, the timescale does not necessarily be only continuously streaming throughout.

Time Alignment and Reference Time Axis. In one embodiment, collected cable data/motor data (722) is used as a reference for a time axis, or any other data that has low latency/low desynchronization, such as cable/motor data (722) which is wired rather than wireless through WiFi/Bluetooth/4G/5G. In one embodiment, the time axis data like cable/motor data (722) may be used as a main clock. Based on the time axis data, synchronization is applied to other data such as camera data (742), IMU data (722), and/or pose data (746). In one embodiment, synchronization includes a rolling window and/or time-to-live signals to ensure relevance to data. In one embodiment, camera data (742) and/or pose data (746) is timestamped in reference to cable/motor data (722). In one embodiment, movement phase such as concentric phase, eccentric phase, and/or isometric phase are tracked and also used to provide a rolling window and/or time-to-live timeout to discard irrelevant or spurious data.

Example of Classifier. One example of a classifier is that for a single leg Romanian deadlift movement. The single leg Romanian deadlift movement is a technical movement with many limb/joint motion. In one embodiment, the classifier is written in software code such as Python, and as output provides a guidance score. In one embodiment, the classifier is machine generated based at least in part on training videos. In one embodiment, the classifier is adjusted and/or hand edited based at least in part on aggregated results.

Inverse Kinematic Tutorial. In one embodiment, guidance models (726) may be compared to a user video (742), user pose data (746), and/or motor/cable data (722), and guidance may include an inverse kinematic tutorial, referred to herein as guidance using inverse kinematics. For example, if a knee is determined to be in a poor form within guidance data (728), for example using trigger rules and/or using trigger rules run backwards into degenerative models, inverse kinematics may be used to take the user pose data (746) and revised with the knee in good form, then using motion retargeting with the revised pose data (746) to demonstrate to the user what they would look like with improved form.

IMU Data and Actuator/Joint Rotation. In one embodiment, IMU data (722) may be used to provide enhanced guidance. For example, for bicep curls and/or bench press with dumbbells, the position of the handle/actuator/hand may be parallel or at a 90-degree rotation for different training purposes and/or different muscle groups exercised. As an improvement to reduce computational resources, the rotation may be parameterized using IMU data (722) and/or computer vision of the hand joint. A result of sensor fusion with the IMU is that instead of guidance such as "You have good bench press form" or "You have poor bench press form", the system may guide "rotate more at the end of your rep" or "do not rotate your wrist during your rep".

Figure 8:
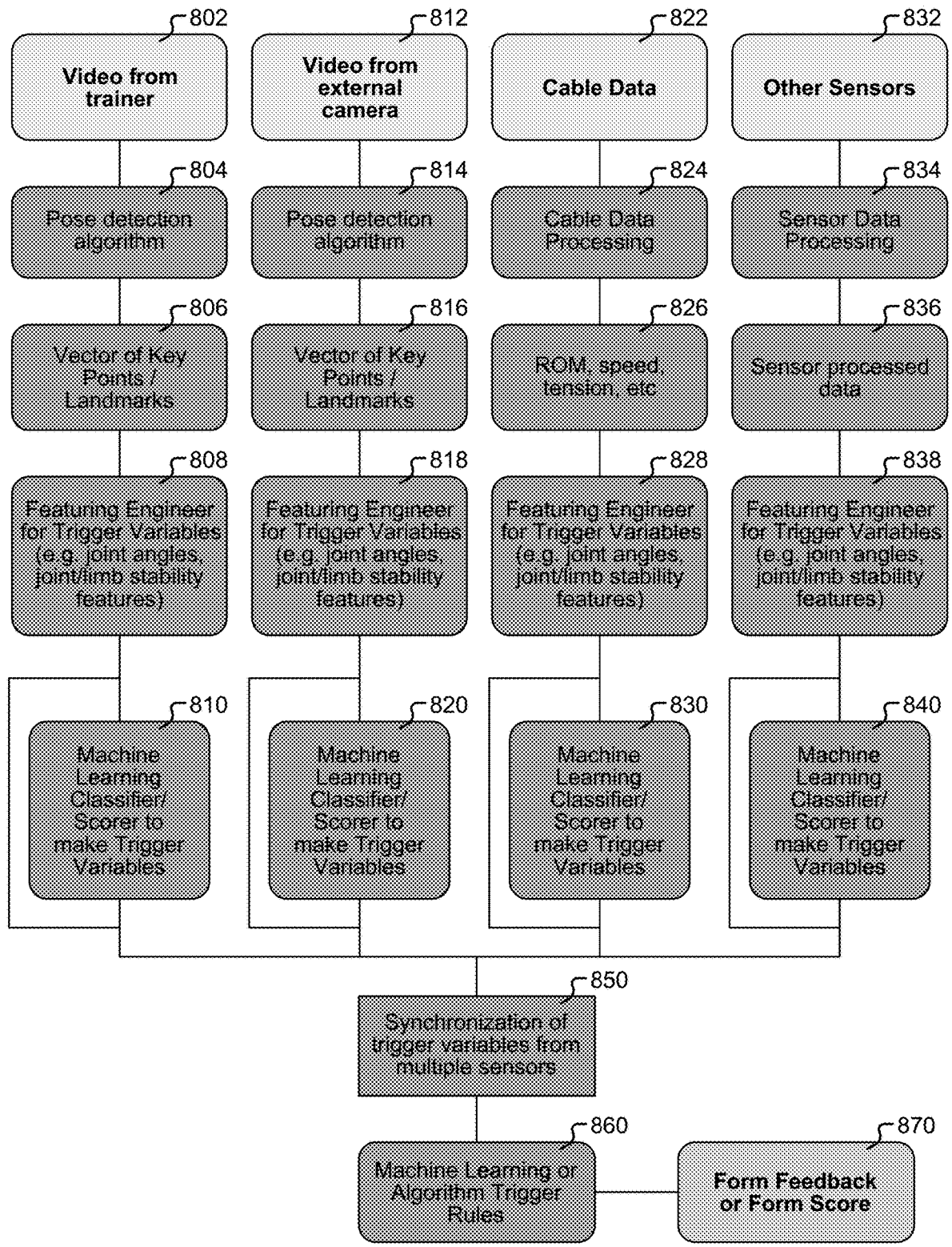
FIG. 8 is a block diagram illustrating an embodiment of a data pipeline for synthesis of exercise guidance training data.

FIG. 8 is a block diagram illustrating an embodiment of a data pipeline for synthesis of exercise guidance training data. In one embodiment, the data pipeline shown in FIG. 8 is processed by the system of FIG. 7.

As shown in FIG. 8, data may come from a plurality of sources including: video (802) from the trainer (702) shown in FIG. 7; video (812) from an external/mobile device (704) shown in FIG. 7; cable and/or motor data (822); and/or other sensors such as IMU data and/or lidar data (832).

For video (802) and video (812), corresponding pose detection algorithms (804) and (814) may be used, respectively, for example pose data models (744) shown in FIG. 7. Data preprocessing and/or processing may be similarly applied to cable data processing (824) and/or other sensor processing (834).

The output of the video/pose detection processing (804), (814) is a vector of key points/landmarks/joints (806), (816) respectively, such as a 32-point vector at the time of each frame of video. The output of the cable data processing (824) is a series of data such as range of motion, speed, tension, acceleration, and so on (826). The output of other sensor processing (834) includes sensor processed data (836).

Feature engineering may be used to transform data into a form easier to interpret. In one embodiment, a featuring engineer for trigger variables (808), (818), (828), (838) for each of the respective processed data (806), (816), (826), (836) creates features, starting from its respective lower-level data. For example, for the video processing case (808), (818), the lower-level data is the pose data/vector output (806), (816) such as 32 element vector pose landmarks. Aggregated features may be created such as angles, lengths, and/or stability metrics. Examples of features are "right elbow angle," "left shoulder mean deviation," or "left knee over toe."

Classifiers and/or scorers (810), (820), (830), (840) may be used for each of the respective featuring engineers (808), (818), (828), (838), in order to create and/or establish trigger variables such as "InlineChestPressHipTorsoFlexionProbability" and "RepCountSinceSetResumed". These trigger variables are all synchronized (850), and trigger rules (860) are used to provide a guidance such as a form feedback or form score (870) on a period basis, for example 30 times per second, corresponding to video of 30 frames per second.

Figure 9:
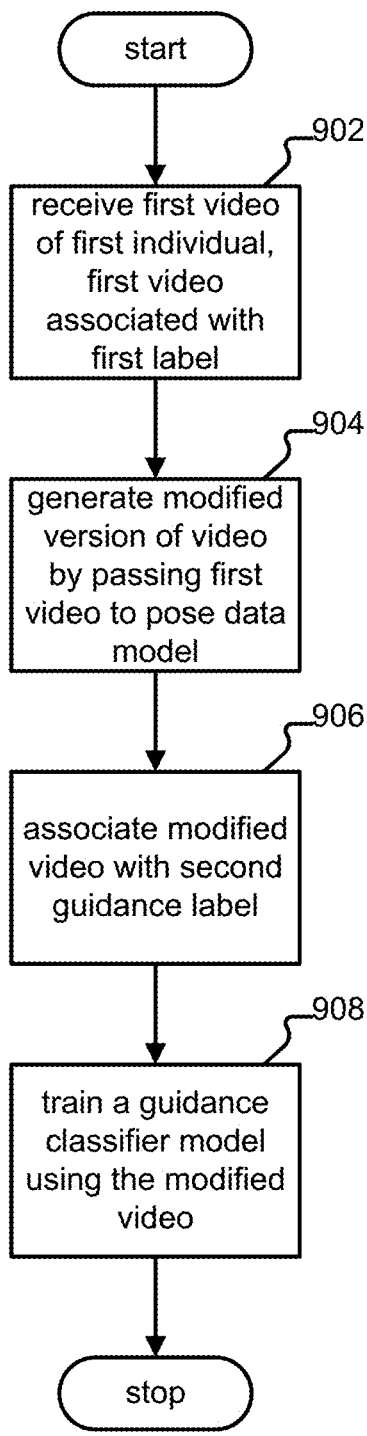
FIG. 9 is a flow diagram illustrating an embodiment of process for synthesis of exercise guidance training data.

FIG. 9 is a flow diagram illustrating an embodiment of process for synthesis of exercise guidance training data. In one embodiment, the process of FIG. 9 is carried out by the system of FIG. 1A and/or FIG. 7, and/or uses the pipeline of FIG. 8.

In step (902), a first video of a first individual performing an exercise movement is received, wherein the first video is associated with a first guidance label. In one embodiment, the first guidance label is at least one of the following: a good form, a bad form, a positive sample, a negative sample, and an assessment.

In step (904), a modified version of a video is generated at least in part by passing the first video to a pose data change model. In one embodiment, the pose data change model performs a global data change, wherein a second video of a second individual is received, and wherein the modified version of the video is a modified version of the second video. In one embodiment, the global data change is a motion retargeting, and the pose data change model is configured to: extract a motion of the first individual from the first video; and inject the extracted motion of the first individual into the second video to generate the modified version of the second video. In one embodiment, the modified version of the second video includes the extracted motion of the first individual.

In one embodiment, the pose data change model performs a local data change. In one embodiment, the local data change is a kinematic adjustment, and wherein the pose data change model is configured to: extract a key point of the first individual from the first video; and adjust a pose data that uses the key point of the first individual and pass the adjusted pose data into the second video to generate the modified version of the second video. In one embodiment, the kinematic adjustment is based at least in part on inverse kinematics. In one embodiment, the kinematic adjustment is based at least in part on forward kinematics.

In one embodiment, the local data change comprises a transformation including at least one of the following: tilt, angle, and change of key point. In one embodiment, the second guidance label is determined based at least in part on the transformation. In one embodiment, the second guidance label is determined based at least in part an inference from the first label. In one embodiment, the inference is a similarity in the event the transformation is a tilt or angle, and wherein the inference is manually set in the event the transformation is a change of key point.

In step (906), the modified version of the second video is associated with a second guidance label. In one embodiment, the second guidance label is based on the first guidance label. In step (908), a guidance classifier model is trained using the modified second video. In one embodiment, training the guidance classifier model uses both the first video and the modified video with their labels.

In an optional step (not shown in FIG. 9): a first pose data is extracted from the first video; and a second pose data is extracted from the modified version of the second video; wherein training the guidance classifier model is based at least in part on the first pose data extracted from the first video, and the second pose data extracted from the modified version of the second video.

Figure 10:
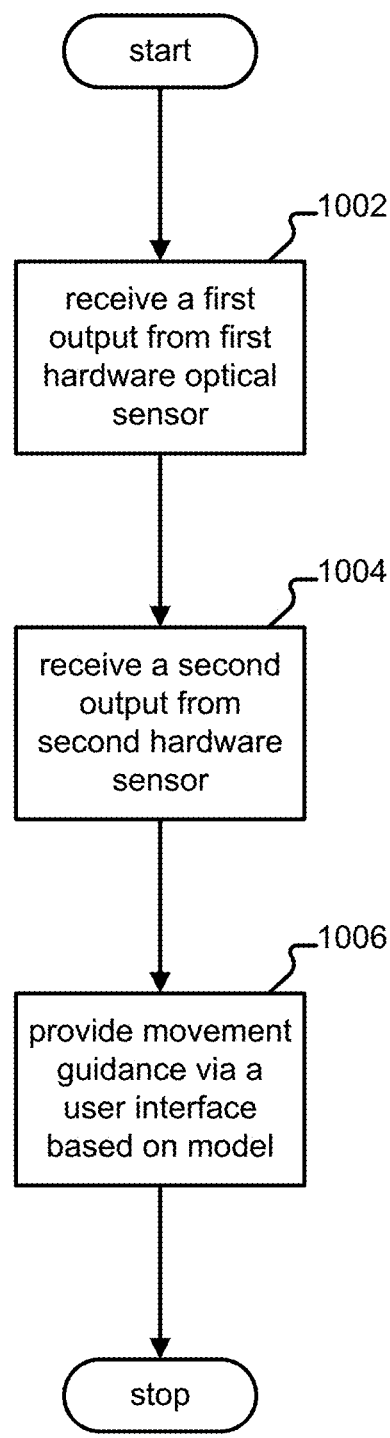
FIG. 10 is a flow diagram illustrating an embodiment of a process for exercise guidance using multi-modal data.

FIG. 10 is a flow diagram illustrating an embodiment of a process for exercise guidance using multi-modal data. In one embodiment, the process of FIG. 10 is carried out by the system of FIG. 1A and/or FIG. 7, and/or uses the pipeline of FIG. 8.

In step (1002), a first output from a first hardware optical sensor is received. In step (1004), a second output from a second hardware sensor is received. In step (1006), guidance for a movement is provided, for example via a user interface.

In one embodiment, the guidance is based at least in part on the first output; the second output; a model based at least in part on historical performance of the movement; and wherein at least one of the first output and the second output triggers a condition.

In one embodiment, the historical performance of the movement is sensed at least in part by the first hardware optical sensor and the second hardware sensor. In one embodiment, the condition is a predetermined condition. In one embodiment, the first hardware optical sensor is at least one of the following: a camera, a mobile camera, a front-facing camera, a side-facing camera, an overhead camera, a lidar sensor, a radar sensor, a depth-sensing sensor, an infrared positioning/reckoning sensor, an imaging stereo depth positioning/reckoning sensor, a near-field positioning/reckoning sensor, and a sonar sensor.

In one embodiment, the second hardware sensor is at least one of the following: a cable position sensor, a motor position sensor, an IMU, an accelerometric sensor, a gyroscopic sensor, a camera, a mobile camera, a front-facing camera, a side-facing camera, an overhead camera, a lidar sensor, a radar sensor, a depth-sensing sensor, an infrared positioning/reckoning sensor, an imaging stereo depth positioning/reckoning sensor, a near-field positioning/reckoning sensor, and a sonar sensor.

In one embodiment, guidance comprises at least one of the following: form feedback, mobility assessment, stability assessment, repetition counting, determining ROM (range of motion), determining flexibility, determining strength, struggle detection, fatigue detection, and/or balance assessment.

In one embodiment, the model comprises a transformation, wherein the transformation comprises at least one of the following: a video transform to pose data key points, a position transform to ROM, a position transform to speed, and a position transform to tension. In one embodiment, the model comprises a featuring engineer for trigger variables. In one embodiment, the model comprises a classifier to make a first trigger variable from the first output of the first hardware optical sensor.

In one embodiment, the model comprises a classifier to make a second trigger variable from the second output of the second hardware sensor. In one embodiment, the model comprises a synchronization of a first trigger variable based at least in part on a reference time for a second trigger variable. In one embodiment, the model comprises a synchronization of a first trigger variable with a second trigger variable based at least in part on a time window. In one embodiment, the model comprises a synchronization of a first trigger variable with a second trigger variable based at least in part on smoothing, rep detection, and/or interpolation in the event the first output lags.

In one embodiment, the model comprises trigger rules combining a first trigger variable and a second trigger variable, wherein the trigger rules comprise at least one of the following: machine learning trigger rules and algorithmic trigger rules. In one embodiment, the combining comprises at least one of the following: logical combining, Boolean combining, algebraic combining, trigonometric combining, weighted combining, threshold combining, binary combining, continuous combining, and mathematical combining. In one embodiment, the model comprises an output of guidance score or guidance feedback to the user interface at least in part to provide guidance for the movement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An exercise system, comprising:
  a first hardware optical sensor;
  a second hardware sensor;
  a user interface that provides guidance for a movement, wherein the user interface comprises a display on the exercise system and wherein the guidance is based at least in part on:
    a first output from the first hardware optical sensor for a user;
    a second output from the second hardware sensor for the user;
    a position data based at least in part on the second output that is associated with a cable position for a cable coupled to an actuator for the user;
    a pose data model for the user based at least in part on historical performance of the movement;
    wherein the pose data model comprises pose data generated at least in part on the first output;
    wherein pose data comprises a set of canonical key points each positioned in three-dimensional space at a specific time and wherein each canonical key point of the set of canonical key points represents a joint for the user;
    a sensor fusion data comprising the position data combined with the pose data model via preprocessing;
    wherein the sensor fusion data is based at least in part on a synchronization of the position data with the pose data model based at least in part on a reference timestamp;
    a trigger variable value determined at least in part on the sensor fusion data; and
    a prediction triggered at least in part on the trigger variable value; and
  wherein the prediction provides the guidance for the movement via the display in an event a confidence parameter for the prediction is above a threshold.

2. The system of claim 1, wherein the historical performance of the movement is sensed at least in part by the first hardware optical sensor and the second hardware sensor.

3. The system of claim 1, wherein the condition is a predetermined condition.

4. The system of claim 1, wherein the first hardware optical sensor is at least one of the following: a camera, a mobile camera, a front-facing camera, a side-facing camera, an overhead camera, a lidar sensor, a radar sensor, a depth-sensing sensor, an infrared positioning/reckoning sensor, an imaging stereo depth positioning/reckoning sensor, a near-field positioning/reckoning sensor, and a sonar sensor.

5. The system of claim 1, wherein the second hardware sensor is at least one of the following: a cable position sensor, a motor position sensor, an IMU, an accelerometric sensor, a gyroscopic sensor, a camera, a mobile camera, a front-facing camera, a side-facing camera, an overhead camera, a lidar sensor, a radar sensor, a depth-sensing sensor, an infrared positioning/reckoning sensor, an imaging stereo depth positioning/reckoning sensor, a near-field positioning/reckoning sensor, and a sonar sensor.

6. The system of claim 1, wherein guidance comprises at least one of the following: form feedback, mobility assessment, stability assessment, repetition counting, determining ROM (range of motion), determining flexibility, determining strength, struggle detection, fatigue detection, and/or balance assessment.

7. The system of claim 1, wherein the model comprises a transformation, wherein the transformation comprises at least one of the following: a video transform to pose data key points, a position transform to ROM, a position transform to speed, and a position transform to tension.

8. The system of claim 1, wherein the model comprises a featuring engineer for trigger variables.

9. The system of claim 1, wherein the model comprises a classifier to make a first trigger variable from the first output of the first hardware optical sensor.

10. The system of claim 1, wherein the model comprises a classifier to make a second trigger variable from the second output of the second hardware sensor.

11. The system of claim 1, wherein the model comprises a synchronization of a first trigger variable based at least in part on a reference time for a second trigger variable.

12. The system of claim 1, wherein the model comprises a synchronization of a first trigger variable with a second trigger variable based at least in part on a time window.

13. The system of claim 1, wherein the model comprises a synchronization of a first trigger variable with a second trigger variable based at least in part on smoothing, rep detection, and/or interpolation in the event the first output lags.

14. The system of claim 1, wherein the model comprises trigger rules combining a first trigger variable and a second trigger variable, wherein the trigger rules comprise at least one of the following: machine learning trigger rules and algorithmic trigger rules.

15. The system of claim 14, wherein the combining comprises at least one of the following: logical combining, Boolean combining, algebraic combining, trigonometric combining, weighted combining, threshold combining, binary combining, continuous combining, and mathematical combining.

16. The system of claim 1, wherein the model comprises an output of guidance score or guidance feedback to the user interface at least in part to provide guidance for the movement.

17. A method, comprising:
receiving a first output from a first hardware optical sensor;
receiving a second output from a second hardware sensor; and
providing guidance for a movement via a user interface, wherein the user interface comprises a display on the exercise system and wherein the guidance is based at least in part on:
the first output from the first hardware optical sensor for a user;
the second output from the second hardware sensor for the user;
a position data based at least in part on the second output that is associated with a cable position for a cable coupled to an actuator for the user;
a pose data model for the user based at least in part on historical performance of the movement;
wherein the pose data model comprises pose data generated at least in part on the first output;
wherein pose data comprises a set of canonical key points each positioned in three-dimensional space at a specific time and wherein each canonical key point of the set of canonical key points represents a joint for the user;
a sensor fusion data comprising the position data combined with the pose data model via preprocessing;
wherein the sensor fusion data is based at least in part on a synchronization of the position data with the pose data model based at least in part on a reference timestamp;
a trigger variable value determined at least in part on the sensor fusion data; and
a prediction triggered at least in part on the trigger variable value; and
wherein prediction provides the guidance for the movement via the display in an event a confidence parameter for the prediction is above a threshold.

18. The method of claim 1, wherein the historical performance of the movement is sensed at least in part by the first hardware optical sensor and the second hardware sensor.

19. A computer program product embodied in a non-transitory computer readable medium and comprising computer instructions for:
receiving a first output from a first hardware optical sensor;
receiving a second output from a second hardware sensor; and
providing guidance for a movement via a user interface, wherein the user interface comprises a display on the exercise system and wherein the guidance is based at least in part on:
the first output from the first hardware optical sensor for a user;
the second output from the second hardware sensor for the user;
a position data based at least in part on the second output that is associated with a cable position for a cable coupled to an actuator for the user;
a pose data model for the user based at least in part on historical performance of the movement;
wherein the pose data model comprises pose data generated at least in part on the first output;
wherein pose data comprises a set of canonical key points each positioned in three-dimensional space at a specific time and wherein each canonical key point of the set of canonical key points represents a joint for the user;
a sensor fusion data comprising the position data combined with the pose data model via preprocessing;
wherein the sensor fusion data is based at least in part on a synchronization of the position data with the pose data model based at least in part on a reference timestamp;
a trigger variable value determined at least in part on the sensor fusion data; and
a prediction triggered at least in part on the trigger variable value; and
wherein prediction provides the guidance for the movement via the display in an event a confidence parameter for the prediction is above a threshold.

20. The computer program product of claim 19, wherein the historical performance of the movement is sensed at least in part by the first hardware optical sensor and the second hardware sensor.

* * * * *